(12) United States Patent
Jha et al.

(10) Patent No.: US 11,354,682 B2
(45) Date of Patent: *Jun. 7, 2022

(54) SYSTEM, METHOD AND COMPUTER PROGRAM PRODUCT FOR SELECTING INTERNET-BASED ADVERTISING

(71) Applicant: Google LLC, Mountain View, CA (US)

(72) Inventors: Vikas Jha, Hillsborough, CA (US); Vassilis Argyrus Papavassiliou, Oakland, CA (US); Rajeev Bector, Saratoga, CA (US); Vishal Goenka, San Mateo, CA (US); Sailendra Padala, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,452

(22) Filed: Jan. 11, 2021

(65) Prior Publication Data
US 2021/0133768 A1    May 6, 2021

Related U.S. Application Data

(63) Continuation of application No. 16/102,470, filed on Aug. 13, 2018, now Pat. No. 10,943,241, which is a
(Continued)

(51) Int. Cl.
*G06Q 30/02* (2012.01)

(52) U.S. Cl.
CPC ......... *G06Q 30/02* (2013.01); *G06Q 30/0245* (2013.01); *G06Q 30/0247* (2013.01); *G06Q 30/0254* (2013.01); *G06Q 30/0274* (2013.01)

(58) Field of Classification Search
CPC ............... G06Q 30/02; G06Q 30/0245; G06Q 30/0247; G06Q 30/0254; G06Q 30/0274
See application file for complete search history.

(56) References Cited

U.S. PATENT DOCUMENTS 5,948,061 A    9/1999  Merriman et al.
6,401,075 B1   6/2002  Mason et al.
(Continued)

OTHER PUBLICATIONS

Langheinrich et al. "Unintrusive customization techniques for Web advertising." Computer Networks 31 (1999) pp. 1259-1272. (Year : 1999).*

(Continued)

*Primary Examiner* — Michael W Schmucker
*Assistant Examiner* — Christopher C Busch
(74) *Attorney, Agent, or Firm* — Marshall, Gerstein & Borun LLP

(57) ABSTRACT

Embodiments of a system method and computer program product for selecting an advertisement and presenting it to a user are described. Products and services offered by various merchants are read using a merchant specific catalog and stored in a common format. Categories for such products and services are normalized and virtual categories are created using various product attributes. Visual creatives, termed as ad-templates are created to control the visual and interactive aspects of the ad, including ad-size, color, as well as product attributes that are displayed in the ad. Ad-templates may be constrained to specific products or product categories. A learning algorithm uses an adaptive sampling process to sample various products, product categories and ad-templates independently for different learning units such as individual users, groups of users determined by some demographics, individual web pages and groups of web pages grouped using various similarity criteria. The performance of the ad is measured using various learning statistics, such as the click-through-rate, conversion rate, etc. The learning algorithm uses the learning statistics to optimize the return for the advertiser by favoring the products or categories that perform better on one or more specified criteria.

20 Claims, 11 Drawing Sheets

Related U.S. Application Data continuation of application No. 11/624,618, filed on Jan. 18, 2007, now abandoned.

(60) Provisional application No. 60/760,325, filed on Jan. 18, 2006.

(56) References Cited

U.S. PATENT DOCUMENTS

| | | | |
|---|---|---|---|
| 7,092,844 | B1 | 8/2006 | Young et al. |
| 8,805,715 | B1 | 8/2014 | Jones et al. |
| 2002/0082923 | A1 | 6/2002 | Merriman et al. |
| 2003/0033292 | A1 | 2/2003 | Meisel et al. |
| 2003/0149938 | A1* | 8/2003 | McElfresh ......... G06Q 30/0201 715/251 |
| 2003/0208756 | A1 | 11/2003 | Macrae et al. |
| 2004/0059708 | A1 | 3/2004 | Dean et al. |
| 2004/0093327 | A1 | 5/2004 | Anderson et al. |
| 2004/0243466 | A1 | 12/2004 | Trzybinski et al. |
| 2005/0154717 | A1 | 7/2005 | Watson et al. |
| 2005/0278443 | A1 | 12/2005 | Winner et al. |
| 2006/0040710 | A1 | 2/2006 | Ruetschi et al. |
| 2006/0074769 | A1 | 4/2006 | Looney et al. |
| 2006/0161534 | A1 | 7/2006 | Carson et al. |
| 2007/0061195 | A1 | 3/2007 | Liu et al. |
| 2007/0124207 | A1 | 5/2007 | Faber et al. |
| 2007/0124288 | A1 | 5/2007 | Swanson et al. |
| 2007/0150353 | A1 | 6/2007 | Krassner et al. |
| 2007/0156887 | A1 | 7/2007 | Wright et al. |

OTHER PUBLICATIONS

Final Office Action for U.S. Appl. No. 11/624,618 dated Aug. 2, 2017 (10 pages).
Final Office Action for U.S. Appl. No. 11/624,618 dated Aug. 4, 2010 (10 pages).
Final Office Action for U.S. Appl. No. 11/624,618 dated Feb. 25, 2016 (40 pages).
Final Office Action for U.S. Appl. No. 16/102,470 dated Jun. 20, 2019 (20 pages).
Final Office Action for U.S. Appl. No. 16/102,470 dated Mar. 17, 2020 (17 pages).
Internet Archives Way Back Machine, http://web.petabox.bibalex.org/web/20010608152115/web.lexis.com/help/multimedia/combine_sources.htm, Jun. 8, 2001 (1 page).
Langheinrich et al., "Unintrusive customization techniques for Web advertising", Computer Networks, vol. 31, 1999, pp. 1259-1272 (14 pages).
Non-Final Office Action for U.S. Appl. No. 10/913,662 dated Nov. 13, 2009 (14 pages).
Non-Final Office Action for U.S. Appl. No. 11/624,618 dated Jan. 16, 2014 (27 pages).
Non-Final Office Action for U.S. Appl. No. 11/624,618 dated Jan. 19, 2017 (24 pages).
Non-Final Office Action for U.S. Appl. No. 11/624,618 dated Mar. 11, 2015 (39 pages).
Non-Final Office Action for U.S. Appl. No. 11/624,618 dated Oct. 14, 2009 (8 pages).
Non-Final Office Action for U.S. Appl. No. 16/102,470 dated Jan. 4, 2019 (17 pages).
Non-Final Office Action for U.S. Appl. No. 16/102,470 dated Jul. 14, 2020 (15 pages).
Non-Final Office Action for U.S. Appl. No. 16/102,470 dated Oct. 9, 2018 (15 pages).
Non-Final Office Action for U.S. Appl. No. 16/102,470 dated Sep. 23, 2019 (18 pages).
Notice of Allowance for U.S. Appl. No. 16/102,470 dated Nov. 13, 2020 (12 pages).

* cited by examiner

SYSTEM, METHOD AND COMPUTER PROGRAM PRODUCT FOR SELECTING INTERNET-BASED ADVERTISING

CROSS-REFERENCE TO RELATED PATENT APPLICATION

The present application is a continuation of and claims priority to U.S. patent application Ser. No. 16/102,470, entitled "SYSTEM, METHOD AND COMPUTER PROGRAM PRODUCT FOR SELECTING INTERNET-BASED ADVERTISING" filed Aug. 13, 2018, which claims priority to U.S. patent application Ser. No. 11/624,618, entitled "SYSTEM, METHOD AND COMPUTER PROGRAM PRODUCT FOR SELECTING INTERNET BASED ADVERTISING" filed Jan. 18, 2007, which in turn claims priority to U.S. Patent Application No. 60/760,325, entitled "SYSTEM, METHOD AND COMPUTER PROGRAM PRODUCT FOR PRODUCT-RELATED AND ENDORSEMENT-BASED ADVERTISEMENT SELECTION AND GENERATION ON THE WEB" filed on Jan. 18, 2006 incorporated herein by reference in their entirety.

TECHNICAL FIELD

Embodiments described herein relate generally to online advertising, and more particularly to the targeting of goods and services-oriented advertising to visitors of web sites.

BACKGROUND

A variety of methods exist for distributing advertisements to web sites. Examples of such methods include Google's AdSense program, Yahoo's Content Match program, and FastClick's advertising system. On-line advertisements can include of a variety of content types such as brand-building banner ads, text ads that may link to the advertiser's web site, and advertisements for specific products or services.

In many forms of Internet advertising (such as the one used in Google's AdSense program), an ad may be identified by several keywords that play a role in deciding which advertisement to select for a given placement for a given visitor of the website. Advertisers submit their inventory of advertisements to the advertisement network by creating ads and identifying each ad with specific words or phrases (keywords) related to their business. The advertisement network then tries to match the keywords with the site placement based on a variety of parameters such as matching the keywords to the content on the website and filtering out unsuitable ads such as those from the competitors of the publisher as well as ads containing objectionable content.

SUMMARY

A system, method and computer program for creating, selecting and presenting an advertisement is described.

Embodiment described herein can be used to create ads for products and services offered by an online merchant by using the merchant's existing product catalog. In addition to receiving such catalogs from merchants, embodiments are set forth herein to help enable the receiving and processing of product catalogs from merchant aggregators such as www.shopping.com. These catalogs (referred to herein as "merchant feeds") may be supplied in form of computer readable data files in structured formats including, for example: XML, Excel or CSV files. The feeds may be securely made available by the merchant using a computer accessible online protocol (e.g., HTTP, FTP, SMTP, etc.) and may also use advanced forms of XML protocols such as, for example WebServices API, or RSS feeds.

The semantics of various data fields in these structured feed files may be specific to the merchant and may be mapped to a normalized feed suitable across various merchants. In one embodiment, the merchant specific feed file may be transformed using a merchant specific data transformer software module to an internal standard format that is written to a relational database. Embodiments described herein, allow the use of various other intermediate transformers and filters that may perform tasks such as dropping objectionable products or services from the merchant feed, marking them with specific tags, and categorizing them into a unified global taxonomy. Embodiments of the invention can also enable the use of additional information, such as for example, product reviews, from third party sources to further enhance information available about various products and services which can be useful in ad selection and presentation.

One of the steps involved in processing the feeds from merchants may be normalization of product and/or categories across ail merchants or merchant aggregators. Normalization refers to a process by which different categories from different merchants may be mapped to a unified global taxonomy. Similarly, product names and descriptions from different merchants may be mapped to a unified, common naming system. In addition to normalization of categories, additional rule based categories (referred to as "virtual categories") may be created based on various product attributes such as price, brand, manufacturer, purpose, and so on. Gifts by occasion, gifts by price range are some illustrative examples of such categorization.

According to one aspect, the generation of advertisement may use presentation templates that determine the visual aspects of the rendered ad. In one exemplary embodiment, a presentation template may specify which of the product attributes (e.g., Product Name, Price, Image, etc.) may be displayed in the ad and using what type of font, image size etc. Embodiments described herein may use an algorithmic learning process to determine which products and services and/or presentation templates are likely to maximize certain measurable success parameters, when shown to a specific visitor or a group of visitors on a certain web page or a group of web pages. This learning along with other information may be used to select appropriate products and/or categories and/or presentation template to be advertised to a given user who may be visiting a given web page.

In one embodiment, the success parameter may be the click through rate of the ads. In another embodiment, the success parameter may be a function of both click through rate and Cost-Per-Click (CPC) of the ads. In yet another embodiment, the success parameter may be function of click through rate, conversion rate, and Cost-Per-Acquisition (CPA). Other embodiments may seek optimizing other success parameters.

Embodiments of the present invention can be used to enable the automatic generation of content for advertisements from the product database. The generated advertisement content may include the product name, description, price, product image, etc. Embodiments may also be implemented that enable the automatic generation and selection of variable granularity advertisements. For example, in certain instances, a category level advertisement may be more appropriate than a specific product ad. A category-level ad may include a description of the category, including some aggregated information about the products in that category, such as, for example, the number of products, average product price.

Generated advertisements may include tracking links so that the clicks on the ads can be appropriately tracked and billed. Embodiments of the present invention may be implemented that do not require the targeting, generation, and serving of ads to be done by a particular type of entity. For example, these aspects may be performed by a publisher, advertiser, or a third party (e.g., an ad serving network), among other entity types.

DETAILED DESCRIPTION

One assumption made in many forms of Internet advertising is that ads that contextually match to the content of the site are likely to be most relevant to the visitor of the website. Visitors to any given website usually have a number of other areas of interest and advertisements that showcase a business or product matching closely to such other interests may also perform very well. However, such ads are easily eliminated during the process of contextual matching. Embodiments described herein addresses this issue using a machine learning algorithm to capture such interests that cannot be directly inferred from contextual matching alone.

The process of creating ads and associating relevant keywords may also limit the number of ads any business can place with such advertising networks. Embodiments described herein address this limitation by leveraging existing inventory of information about individual products and services that businesses may already have, to dynamically create millions of ads with rich information about such products and services including their taxonomy, prices, user reviews, expert reviews, sales rank, etc. without any direct human intervention tor each product or service.

Online Ad Serving

Figure 4:
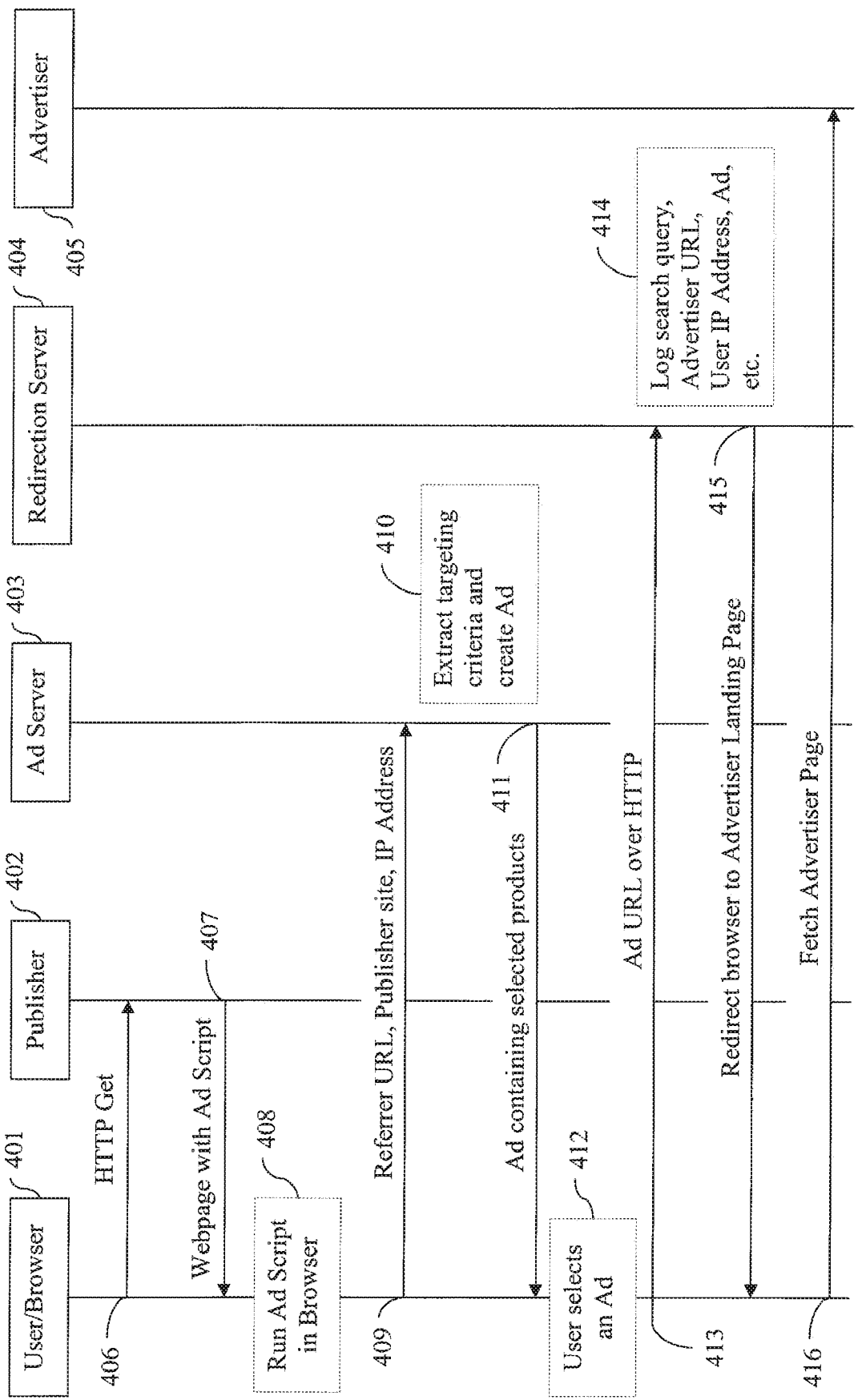
FIG. 4 is an exemplary process flow representing the various exemplary interactions between systems and modules involved in the embodiments of the ad serving process described herein.

Embodiments of the present invention enable serving online advertisements to web browsers, such advertisements containing products and services offered by advertisers. FIG. 4 and the following discussion depict the interactions between various parties in an exemplary online ad service process as illustrative of a system capable of utilizing the benefits of the present invention. The user's web browser 401 initiates a request 406 to fetch a web page from the publisher's web server 402. The publisher's web server 402 returns a response 407 containing markup for the requested web page and an embedded ad script. The browser provides the environment in which the ad script is executed. As the browser loads the web page, the embedded ad script is executed within the container page as depicted by processing step 408. During this execution, the ad script evaluates several parameters relevant to the ad serving process that are made available to it by the browser environment, such as, for example the URL of the web page requested by tire browser. These parameters are passed to the ad server 403 in an ad request 409 issued by the browser as pan of executing the script. The ad server 403 receives the ad request 409 and extracts the parameters passed by the script as well as other parameters made available by the network protocol, such as, for example, the IP address of the user's machine that is hosting the browser and a unique string representing the browser type. The ad server then executes an internal process 410 to create an ad for the user's browser using the input parameters. This process is illustrated in more detail in FIG. 5 and discussed throughout this document. The ad may display a plurality of products, services or product categories offered by a plurality of merchants. The ad server sends a markup to the browser in a response 411, the markup containing the created ad. The browser 401 renders the ad visually using the markup. The user may choose to select the ad 412 and learn more about the products, services or product categories displayed in the ad. The selection of the ad by the user causes the browser to request 413 the embedded ad URL from a redirection server 404, which processes the request as depicted by step 414 to log various request parameters such as, for example requested product or service, requestor's IP address, time of request, ad template used for the ad and identity of the publisher 402. The redirection server 404 sends a redirect message 415 to the browser with the URL of the advertiser's web page that contains more details about the product or service contained in tire ad that was selected by the user in step 412. The browser requests the advertiser's page 416 and display's the selected product or service to the user.

Catalog Processing

Figure 1:
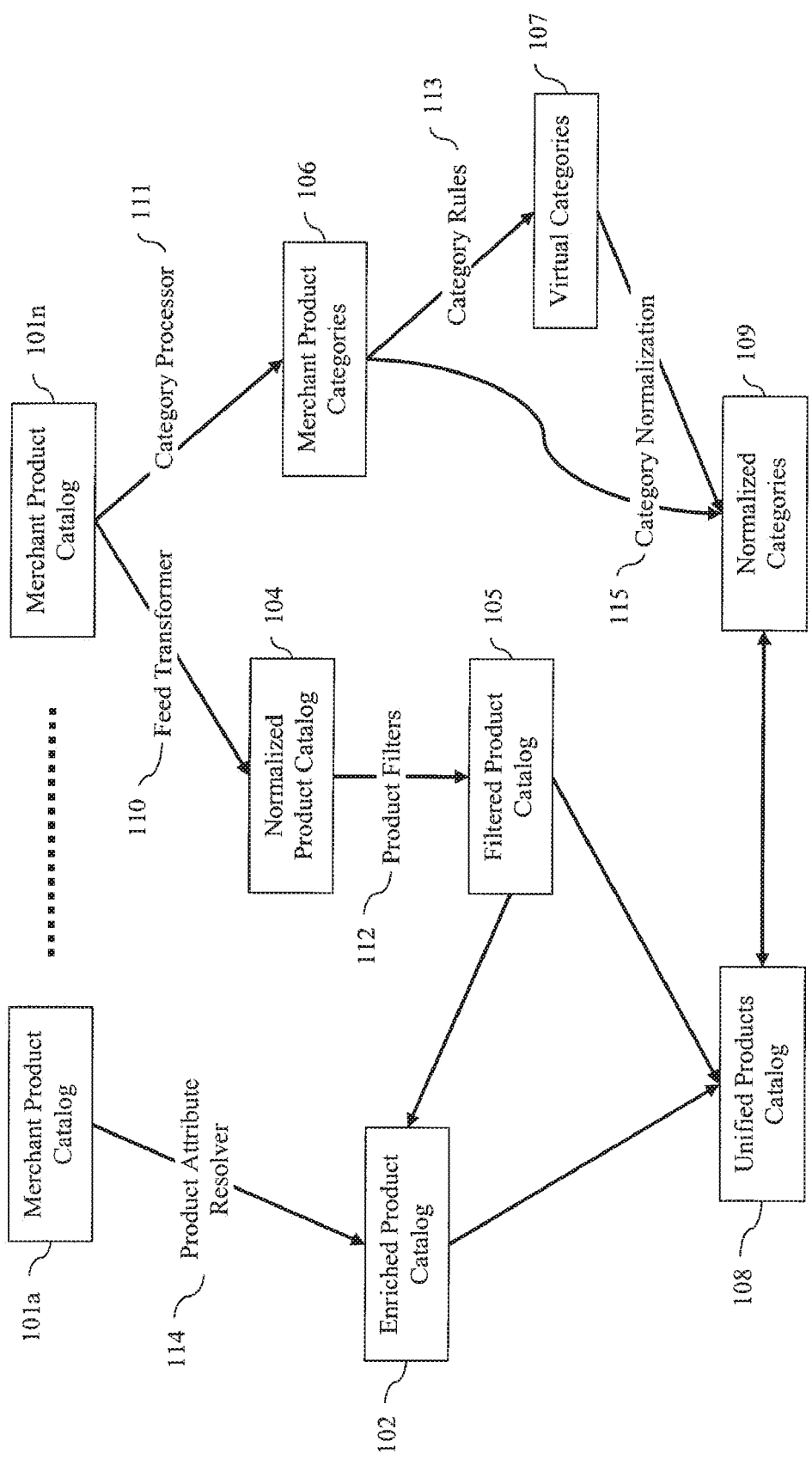
FIG. 1 flow chart of a various steps that may be involved in merchant catalog processing showing various intermediate states of the catalog feed in accordance with one embodiment.

Embodiments of the present invention allow automatic creation of a rich set of ads for products and services from product/services feeds provided by merchants and merchant aggregators. FIG. 1 and the following discussions depict the various steps involved in processing a merchant or merchant aggregator's product catalog as illustrative of a system capable of utilizing the benefits of the present invention. The product feed 101a-101n provided by the merchant may be any structured data file or stream. Some merchants provide an XML file with an associated schema describing their feed semantics, where as others may provide a WebService API based access to their products and services.

In one embodiment of the present invention, a software module termed feed transformer 110 may be written for each merchant that retrieves and parses the product feed from that merchant. Each data record in the feed may contain attributes of the product or service such as, for example, name, description, list price, UPC code and image URL. The feed transformer 110 converts them to a schema that is specific to the embodiment. A schema translation of this nature may use mappings from the partner specific schema to an embodiment specific schema and may use well known XML transformation techniques such as XSLT as may be known to those versed in the art. The feed transformer uses the schema translation as defined above to create a normalized product catalog 104 that maps the information to a common semantics. The common semantics for the products and services may define all attributes that are necessary for creation of ads as will be discussed throughout this section. The common semantics may include a superset of attributes that is provided by any individual merchant, since usually the same product or service is often provided by other merchants.

One embodiment of the present invention may infer additional information about the products using the feed from other third party sources using a software module termed product attribute resolver 114 to create an enriched product catalog 102. Examples of such information include but are not limited to list price, description, merchant rating, product rating, product reviews and product images. The product attribute resolver 114 may query other merchants for additional attributes of the product that needs to be enriched with additional information, or it may search in another merchant's catalog feed for additional product attributes for specified products. In one embodiment, the attribute resolver uses the product's SKU or UPC to query other merchants for the product, using the merchant specific product feed API.

Merchants and merchant aggregators may define their own unique taxonomy for categorization of their offerings. The taxonomy may be hierarchical and a product may be categorized in a plurality of categories. Merchant's feed may contain the product's categories. According to one aspect of this invention, the merchant product categories 106 are retrieved from the merchant's product feed using a category processor 111 and may be kept separate for each merchant. According to another aspect of this invention, the categories may be normalized across all merchants using a combination of automated and manual matching of categories across different merchants using a software module and process termed category normalization 115 to create normalized categories 109. Since merchants may not change their taxonomy very often, such a combination of automated and manual normalization of categories may be acceptable from a resource requirement point of view in one embodiment of this invention. Various merchant aggregators perform category normalization across the products and services of different merchants and the software module and process for category normalization may be known to one skilled in the art.

According to one aspect of the invention, the systems and methods of the present invention may provide the publishers who own the websites a choice on the matter of specific products or services, or product or service categories that may be shown, or be excluded from being shown, as ads on the website. Embodiments of the present invention enable lagging various products and services with pre-determined key words that enable dynamic categorization of products/services using such key words and various product attributes such as, for example, price and brand in one or more additional virtual categories 107. Such categorization is specified using category rules 113 that are evaluated to create virtual categories 107.

The present invention also enables filtering out products and services from the feeds provided by the merchants using rules processing engine embodied in a software module and process termed product filters 112, where Use rules may be based on one or more attributes of the products or services. In the illustrative embodiment depicted in FIG. 1, the filtered product catalog 105 is used to create the unified product catalog 108, using additional attributes obtained using the product attribute resolver 114.

Learning Based Product Ad and Template Selection

The systems and methods of the present invention enable algorithm-based selection of products and services to be displayed as ads on a particular web page or web site, or to a particular visitor. These are collectively referred to as product ad selection or targeting algorithms, where product implies both products and services. Algorithms enabled by the present invention include but are not limited to the examples provided below.

According to one aspect of the present invention, the general problem of product ad selection or targeting may be described as follows: 'given a database of products, select specific products or groups of products (e.g. a category of products) to be displayed as advertisement on a given web page visit by a user'. Several different types of algorithms may be used to do product ad targeting. They may be divided into two broad categories, namely content based algorithms and learning based algorithms. The systems and methods of the present invention also enable combining these two types of algorithms.

In content based algorithms each product and category in the product database may be associated with words or phrases known as keywords. These keywords may be derived from the names and/or description of the product and/or categories as contained in various product feeds. In some cases, the keywords may also be provided by the merchants in the feeds. Content of the web page, where the advertisement is being displayed, may be analyzed to determine if it contains or is otherwise represented by one or more of the keywords of one or more of the products and/or categories in the database. If multiple matches are found, they may be ranked in order of the quality of the match. Quality of the match may be determined by the number of keywords that match as well as by identifying the semantics of keywords when the same word may carry different meanings in different contexts, additionally weighted by where the keyword occurs in the page. For instance, if the keyword occurs in the title of the page or a paragraph heading, it may get a higher weight. Several similar heuristics may be used to rank the various products/product-groups that match. Then, the top N products/product-groups are displayed as advertisements where N depends on how much space is available for ad display on the web page.

Learning based algorithms on the other hand, may learn over a period of time the products or product-groups that perform best as advertisements, as determined by one or more objective functions calculated for a given set of inputs to the learning process.

Objective Function

The systems and methods of the present invention enable the use of a mathematical function termed as objective function to represent an outcome of the advertising process. An embodiment of this invention may define several objective functions, such as for example click-through-rate (CTR) of an advertisement, which may be defined as a ratio of number of times a particular ad is selected (clicked-on) by a user to the number of times the ad is displayed. CTR may also be defined for a specific product, a product category, and ad-template and so forth as illustrated in following sections. Other illustrative embodiments of the objective function may include CTR multiplied by cost-per-click (CPC), or CTR by conversion rate multiplied by commission-per-sale. Several other objective functions, or combinations thereof, may be used.

The systems and methods of the present invention enable the use of various inputs to the learning process. An illustrative embodiment may use the following inputs:

(a) User to whom the ad may be displayed. The user may be identified using a browser cookie, among other means.

(b) Web page on which the ad may be displayed. The web page may be identified using a URL.

(c) Time-of-day when the ad may be displayed.

(d) Products and services that may be eligible to be shown as ads.

(e) Ad-Templates are the visual creatives that define the presentation of the ads.

Figure 5:
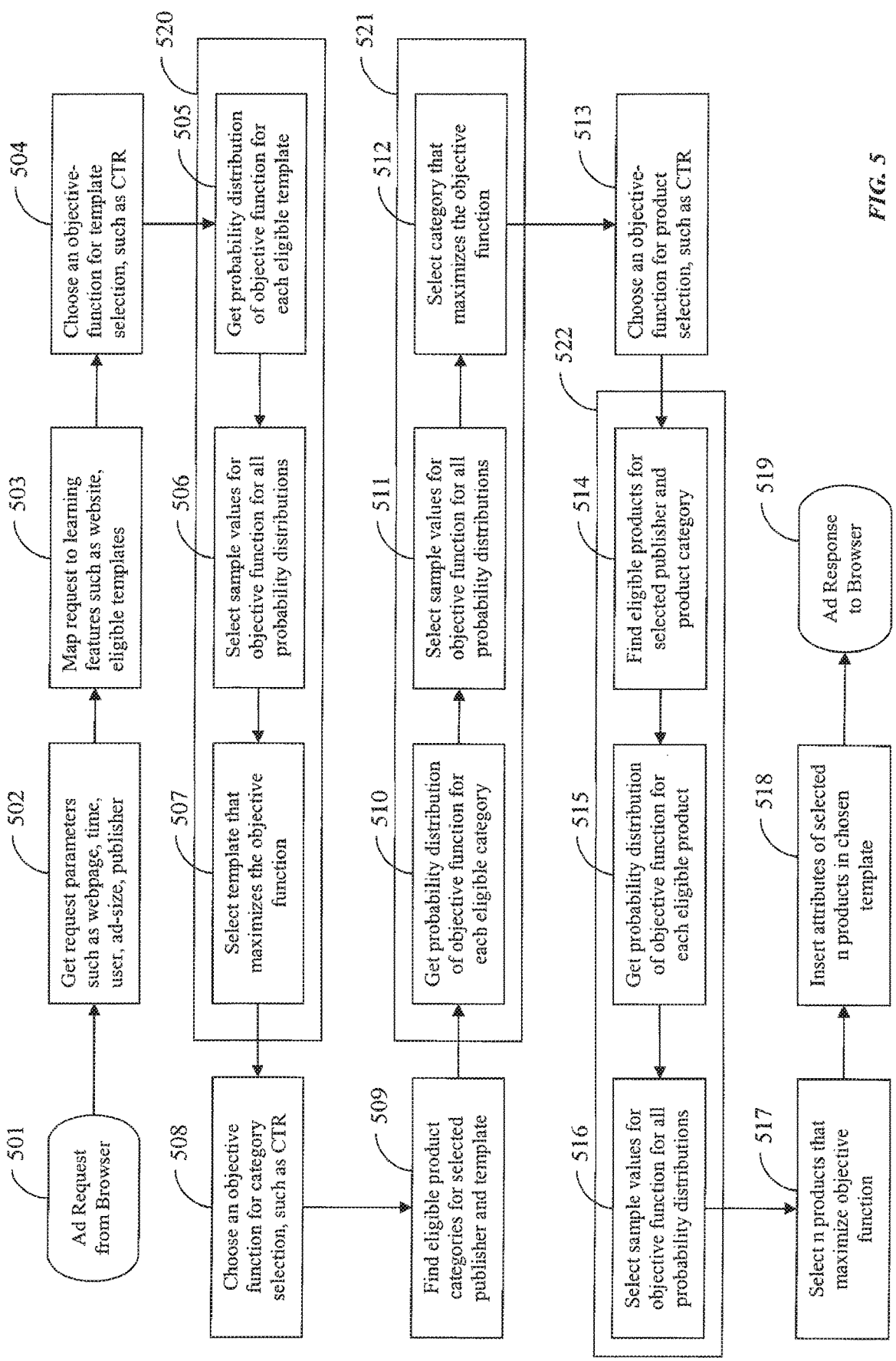
FIG. 5 is an exemplary process flow representing the various steps taken to select an ad-template and products to display in the ad for a given ad request by a user.

Each input as illustrated above may have several features associated with it. A feature of the input may be a name, value pair. Such as for example, a particular user may have geo-location=San Francisco, bandwidth-broadband as features. A product may have the features category=MP3 Players, price=$153.00, brand=Apple, associated with it. As depicted in FIG. 5, an illustrative embodiment maps inputs that are contained in the ad request to learning features in step 503 for modeling the objective function for template selection.

In an illustrative embodiment, the application of learning algorithm may involve two steps—Modeling Step and Optimization Step Modeling In one embodiment of the invention, the learning algorithms may model the probability distribution of the objective function as a beta distribution for a combination of two features corresponding to two learning inputs. Such as for example, the learning algorithms may model the probability distribution of click-through-rate (CTR) for categories (a feature of the input products) on web sites (a feature of the input web page). Referring to FIG. 5, the ad selection process in an illustrative embodiment may choose an objective function of click-through-rate (CTR) for choosing the categories as depicted in step 508 and then use the probability distribution of the objective function for selected categories as depicted in step 510.

Other embodiments of the invention may construct other mathematical models of the different objective functions using more than two features as illustrated below.

Figure 2:
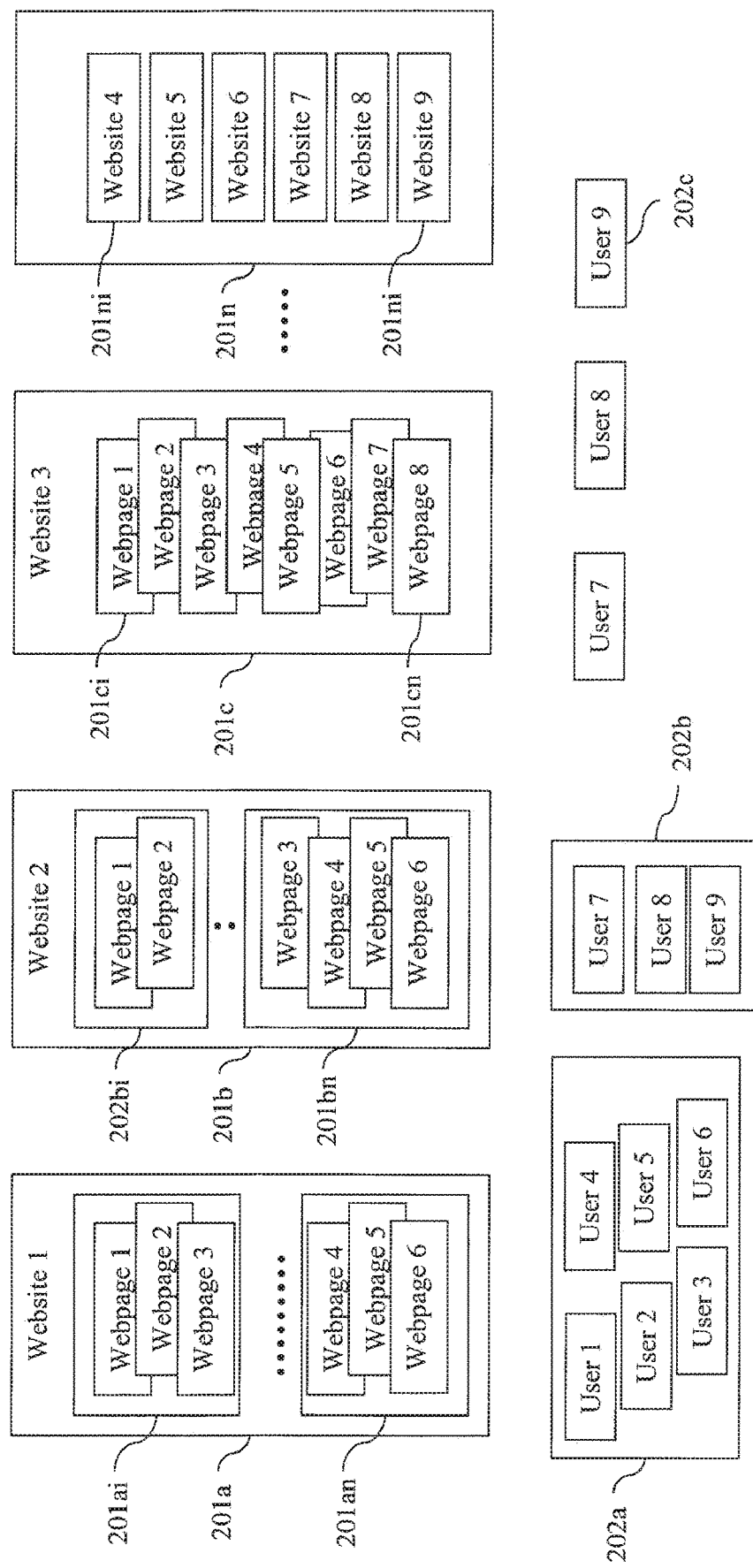
FIG. 2 illustrates an exemplary categorization of inputs to the learning process such as web sites and users.

The systems and methods of the present invention enable grouping various learning inputs using a combination of their features and modeling the objective function for such groups of inputs. FIG. 2 is an exemplary illustration of grouping users in various groups 202a-202c using features such as for example, geo-location or bandwidth. Another exemplary illustration depicts web pages on a website 201a grouped in groups 201ai-201an based on one of many features of the page such as for example URI prefix.

Figure 3:
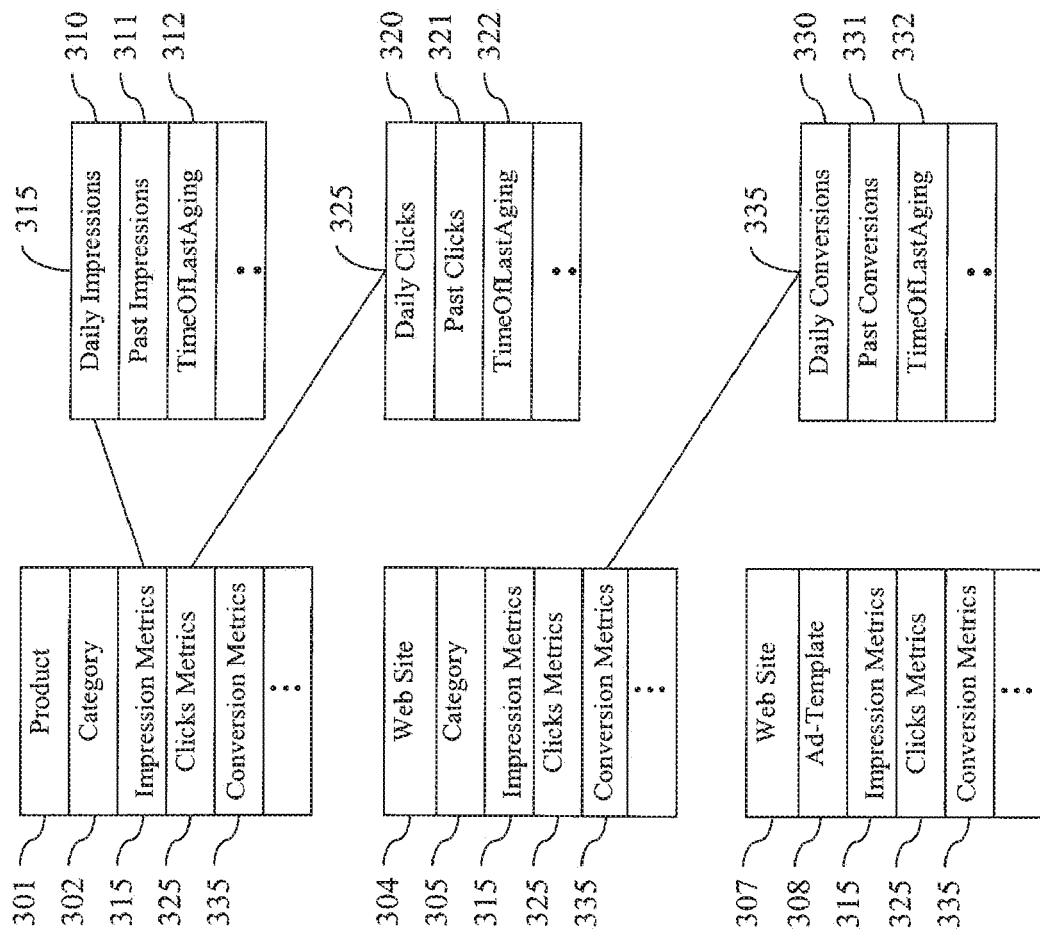
FIG. 3 is a schematic representation of one embodiment of learning data stored to measure the click-through-rate of various combinations of inputs to the learning process, and used in modeling the probability distribution of the objective function.

Referring now to FIG. 3 which is a schematic representation of the data stored to model the objective function CTR for various inputs to the learning process according to one embodiment of the current invention.

In an illustrative embodiment, modeling step may model the objective function CTR by storing the daily impressions 310 and daily clicks 320 for one or more product categories 305 such as for example, MP3 Players and LCD TVs on a given web site 304 such as for example www.macnn.com.

In another illustrative embodiment, modeling step may model the objective function CTR by storing the daily impressions 310 and daily clicks 320 for one or more ad templates 308 on a given web site 307 such as for example www.macnn.com.

In yet another embodiment of the invention, modeling step may model the objective function CTR by storing the daily impressions 310 and daily click 320 for one or more products 301 such as for example iPod 4 GB Nano, Creative 10 GB Zen and Microsoft 30 GB Zune in a product category 302 such as for example MP3 Players.

Optimization

Given a model of an objective function against a number of input features, probabilistic or deterministic, optimization step may involve making input selections that would maximize the objective function. Such as for example, given a web page belonging to the web site www.macnn.com, and probability distribution function model of CTR for various categories such as MP3 Players and Flat Screen TVs on the web site www.macnn.com, optimization step may involve the selection of category or categories that optimize the long-term CTR. In one embodiment, such a selection may be made by selecting the category that has the highest probability of generating the maximum CTR value. This is termed as 'exploitation' where input selections with higher probability of maximizing lire objective function are selected preferentially.

The algorithm may also select inputs with lower probability of maximizing the objective function. However, if the selection may result in sub-optimal value of the objective function with a high probability, the selection may not be made. This is termed as exploration where the algorithm attempts to make input selections for which the confidence in the probability distribution of the objective function is low due to lack of trials. In the case where objective function is CTR, inputs that have received fewer impressions may have low confidence in the probability distribution. The rationale behind this may be to give a chance to this input selection at being the best selection. The optimization step may have to negotiate a careful trade-off between exploitation and exploration.

In an illustrative embodiment, the optimization step may select a product category to be shown on a particular web site such as for example www.macnn.com, given a model of an objective function for various product categories such as for example MP3 Players and Flat Panel TVs on that web site.

In another illustrative embodiment, the optimization step may select a specific ad template to be shown on a particular web site such as for example www.macnn.com, given a model of an objective function for various ad templates on that web site. Referring to FIG. 5, steps 505, 506 and 507 collectively identified as step 520 illustrate an embodiment of the optimization step to select an eligible template for a given web site.

In yet another embodiment of the invention, the optimization step may select specific products such as for example iPod 4 GB Nano, Creative 10 GB Zen and Microsoft 30 GB Zune to be shown, given a model of an objective function for various products in a given product category such as for example MP3 Players. Referring again to FIG. 5, steps 514, 515 and 516 illustrate the steps in an embodiment of the optimization step to select a plurality of products for a selected category.

Aging of Learning Data

Popularity of products, product categories, and ad templates may change with time for many reasons such as for example, people on a web site may have already seen those products several times, the price may drop for a product or the product may be appropriate for an upcoming festive occasion. Therefore, the learning algorithms may incorporate mechanisms to age the learning data that is used in the modeling step.

In one embodiment of the invention, the impressions and clicks may be discounted by a constant or variable factor corresponding to passage of some unit of time. Referring again to FIG. 3, each day the total impressions up to the last day 311 may be multiplied by a factor and the daily impressions 310 for that day may be added to it and stored as past impressions 311. The time of last aging 312 can be updated to record the last time when the impressions were aged. Likewise, each day the total clicks up to the last day 321 may be multiplied by a factor and the daily clicks 320 for that day may be added to it and stored as past clicks 321. In another embodiment, the learning data may be adjusted upon detection of some event such as a price change. In yet another embodiment, the learning data may be adjusted upon the detection that the new learning data is significantly different compared to the historical learning data.

Display of Product Ads

Another aspect of the present invention is the process of automatically generating the content of the product-related ads, from the product catalogs supplied by the merchants ("feeds"). An illustrative embodiment of the present invention may generate the following types of ads for products and services:

(a) Ads for specific product or service. The following information about the product or service may be relevant to generating such ad content and may be available as a result of processing the merchant feed.
  (1) Name
  (2) Category
  (3) Description
  (4) Image URL
  (5) Price
  (6) Merchant name
  (7) Reviews/ratings
  (8) Sales rank etc.
  (9) Product landing page on a given merchant's web site (b) Ad for product or service category. The following information about the product or service category may be relevant to generating such ad content and may be available as a result of processing the merchant feed.
  (1) Name of the category
  (2) Number of products in the category offered by a given merchant
  (3) Minimum, maximum, average price of the products in the category offered by a given merchant
  (4) Category landing page on a given merchant's web site According to another aspect of the present invention, ads may be created from products using visual creatives termed as ad-templates that determine the look and feel of the ads as well as any interactive features. In an illustrative embodiment, attributes of such ad-templates may include the size in pixels that the ad will take on a website, the number of products that may be displayed within the ad as well as the attributes of the product that may be displayed, where attributes include information such as the product title, one or more images, description, list price, offer price, sale price, merchant name, merchant rating, product rating, product reviews, product endorsements, etc.

An ad template may be specified by the system administrator or the owner/operator of the web site that specifies how the above mentioned pieces of information may be combined automatically, at run-time, to generate the ad content for either the product-specific ad or the category-level ad. For instance, a product-specific ad template may specify "two lines of product name, followed by 2 lines of product description, followed by product image, followed by price, followed by merchant name". Or, a category-level ad template may specify "2 lines of category name, followed by number of products, followed by average price, followed by merchant name".

Multiple ad templates may also be specified, along with rules that constraint or favor using of certain ad-templates with certain web sites, products or product categories. Embodiments of the present invention may apply the learning algorithms described above, including the modeling step and optimization step, to learn which ad templates perform better on which sites or to which users or for which products or product categories.

As described above, the Click-Through-Rate (CTR) may be defined in one embodiment as the ratio of the number of times a particular product or product-group ad is clicked-on by a user to the number of times that product or product-group is displayed as an advertisement. According to one aspect of the present invention, click-throughs may be tracked by using a redirection server that records the click before redirecting the user to the landing page corresponding to the ad that the user clicked on In addition, the Conversion-Rate (CR) may be defined in one embodiment as the ratio of the number of times a certain desirable "action" is performed by users on a particular product or product-group ad to the number of times that product or group of products is displayed as an advertisement. The desirable "action" may include buying the product, or buying one of the products in the group, or registering on a mailing list, or registering the product in a "wish-list" etc. According to one aspect of the present invention, the tracking of conversions may be done by using HTTP cookies set in the user's browser and invisible tracking images placed on the conversion pages of the merchants shopping carts.

In accordance with the disclosures herein, embodiments of a catalog processing system may be implemented for creating online advertisements automatically from product catalog of merchants and merchant aggregators. In such a system, an interface may be provided to configure partner merchants or merchant aggregators whose product catalogs should be used for online advertisements. Another interface may be included to configure the protocol parameters in order to access the merchant's product catalog.

A merchant specific feed processor module may be used to normalize the product catalog to a common semantics. The merchant specific feed processor module may include an interface to specify a plurality of rules to filter products out and an interface to specify a plurality of rules to add a plurality of tags to products based on product attributes.

Products attributes can be looked up across other a plurality of merchants to supplement attributes contained in any given merchant's catalog.

A merchant specific category processor module may also be provided to extract the product category taxonomy used by the merchant. The merchant specific category processor module may include an interface to specify a plurality of rules to create a plurality of virtual categories based on product attributes and an interface to aid manual input to category normalization across a plurality of merchant categories. Categories across a plurality of merchants can be normalized along with virtual categories to create a global normalized category taxonomy containing a plurality of product categories.

In accordance with embodiments described herein, a learning based product ad and template selection system is also disclosed for creating online advertisements by selecting one or more eligible inputs from a large inventory of available inputs. The learning based product ad and template selection system may include a machine learning algorithm based selection of eligible inputs. The eligible inputs include a plurality of attributes of products and services that can be shown as ads, time of day, such as season, day of week, month, and so forth when the ad is displayed, web pages where the ads are displayed, users to whom the ads are displayed, visual presentation templates for displaying the ads from an inventory of several templates, and so forth.

The machine learning algorithm uses an objective function to represent the outcome of the advertising process. In one embodiment, the objective function can be the ratio of clicks on a given ad to the number of times that ad is displayed. In another embodiment, the objective function can be the ratio of ad commission paid by the merchant to the total number of times that ad is displayed. In yet another embodiment, the objective function can be the ratio of sales revenue shared by the merchant for sales generated by the ad to the total number of times that ad is displayed, hi a further embodiment, the objective function can be a mathematical function calculated using a plurality of outcomes of the advertising process.

The learning based product ad and template selection system may further include a probabilistic model of the objective function that may be used for a plurality of eligible inputs. A deterministic model of the objective function can be used for a plurality of eligible inputs. In one embodiment, an optimization function may be used for optimization of the objective function. The optimization function may select inputs that seek to maximize a plurality of objective functions over a plurality of selected inputs using the high confidence in the probabilistic model for the said objective functions (i.e., exploitation). In another embodiment, the optimization function may select inputs that seek to increase the confidence in the probabilistic model for a plurality of objective functions over a plurality of selected inputs by allowing more trials at the expense of maximizing the said objective functions.

In one embodiment, the aging of learning data may be considered. For example, the objective function may be calculated using a plurality of outcomes of the advertising process where the outcomes are weighted more in favor of recent outcomes and less in favor of past outcomes (i.e., aging by time). In another embodiment, the objective function may be calculated using a plurality of outcomes of the advertising process where the outcomes are weighted using attributes of the inputs to the learning process (aging using other criteria)

In accordance with embodiments described herein, a system for creating online advertisements may also be implemented in which one or more eligible ad templates are selected from a large inventory of available ad templates. In this creation system, a unified product catalog may be created containing a plurality of attributes of a plurality of products to be used in the ad. In another embodiment, a unified category taxonomy may be created containing a plurality of categories to which products in the unified product catalog can be classified. The unified category taxonomy may contain a plurality of hierarchical categories.

In one embodiment, an ad-template can control the visual presentation aspects of displaying attributes of the product or category in the ad. The ad templates can be associated with attributes of a plurality of inputs to the learning process. Such an association can imply a restriction on the products or categories that can be displayed in the ad template. In another embodiment, such an association can imply a restriction on die placement of the ad template. The placement may be to: users to which the ad is displayed, the website on which the ad is displayed and the time when the ad is displayed. An interface may also be provided to configure the association of the ad template with a plurality of inputs to the learning process.

The embodiments described herein permit the associating of different weights to different products or product categories based on the returns to the advertiser for a successful action by a visitor. In one illustrative embodiment, such a weight may be the cost-per-click that the advertiser is willing to pay for successful leads generated by advertisement. In another illustrative embodiment, a weight may be the cost-per-acquisition that the advertiser is willing to pay for a successful conversion generated by the advertisement. One or more of such weights may be associated with a product and may be used by the learning algorithm as part of the objective function. For instance, given two products with equal click-through-rate, the algorithm may sample the product with higher cost-per-click with higher frequency as compared to the one with lower cost-per-click.

Advertisements With Endorsements

Online advertising of products and services is a fairly common mechanism for merchants and businesses to reach their target audience. Such advertisements generate revenue for publishers who own the websites where the ads are displayed to the users of the site. Online advertising almost exclusively generates all the revenue for so many websites that it has become all too pervasive in a typical web browsing experience of any user. As a consequence of this pervasiveness, users often find such ads distracting anti less useful, reducing their value to the users and therefore the advertisers.

The Internet has also become one of the most popular medium for users to research products, services, brands and businesses and the growing c-commerce revenue year after year indicates that many users buy products and services online. Even many brick-and-mortar sales are often preceded by extensive online research on the brand or the business. Since each product, service and business attempts to describe itself in the best possible manner, the unbiased experience of other users with them plays a very important and reliable mechanism to convey its value to other consumers. Such experiences, both positive and negative ones, are captured as user-reviews and expert-reviews and several websites on the web allow users to post their experiences for the benefit of others. We refer to such shared experiences as endorsements and the websites that enable them as endorsement sites.

Currently endorsements of products, services and businesses are displayed on the endorsement websites and are available for users to view at such sites. Online advertising however is much more pervasive and displays products and services on websites that are not necessarily endorsement sites. The current invention increases the visibility of endorsements beyond the endorsement sites by using endorsements in online ads. Such endorsements may be collected on web sites where the online ads are displayed, or on other web sites. The current invention enables both collection and use of such endorsements. The entity collecting such endorsements may be publishers, ad network, or advertisers. Incorporating endorsements as part of online ads has tire potential to significantly increase the effectiveness of online ads for products, services, brands and businesses.

Online communities have long since used the collective experience of the users of the community as an effective way to research products, services and businesses. This has significantly improved referrals for businesses in the service industry. It has also effected sales of products both online and offline in the brick and mortar shops. Most online businesses allow their users to leave feedback on their products and services for other potential customers to see, in hopes of capitalizing on the goodwill generated by positive endorsements. Merchants that broker products and services, notably the comparison shopping sites ranging from consumer goods to travel related services, insurance and banking products and services, most of them allow users to provide feedback that can be viewed by other users and help them in their buying decision. Examples of such sites include epinions.com and amazon.com.

Some websites use experts in the field to complement the endorsements of consumers by having them endorse products and services. Sites like cnet.com and zdnet.com are examples of such websites. Some websites specialize in identifying bargains and short term product and service promotions allowing their members as well as expert bargain hunters to endorse deals offered by various businesses. Examples of such sites include techbargains.com and fatwallet.com.

Accordingly, embodiments are disclosed of an endorsement system, method and computer program product for displaying endorsements in conjunction with advertisements. The system includes a first interface for users that may be provided to endorse products, services and businesses displayed in an advertisement presented in a browser. The system may also include a second interface that is provided for users to search for products, services and businesses in a catalog and endorse a plurality of products, services and businesses that are displayed in search results presented in a browser. The system includes a third interface may be provided for users to view, in a browser, a plurality of endorsements for products, services and businesses provided by a plurality of users.

In one such embodiment, the interfaces may be displayed in a portion of the where the advertisement is presented. In another embodiment, the interfaces may be displayed at an endorsement site.

The first interfaces may require endorsements to follow a prescribed structure and contains fields that the endorser must fill for the endorsement to be displayed in the advertisement.

In one embodiment, the advertisement may be created to be displayed to users of a network. In one such embodiment, the advertisement may have at least one of: (i) a plurality of attributes of products, services and businesses endorsed by a plurality of users and/or (ii) a plurality of endorsements of products, services and businesses. In another such embodiment, the endorsements may be provided by users of the network who are not compensated financially for their endorsements. As an alternative or in conjunction to non-paid users, the endorsements may also be provided by users of the network who are compensated financially for their endorsements. In yet another implementation, the endorsements may be provided by users of the network who have a celebrity status in the opinion of other users of the network. In a further embodiment, the endorsements may be provided by users of the network who are experts on the subject.

The advertisement may include information on whether the creator of the displayed endorsement was compensated for the endorsement. The advertisement may further include information on how the creator of the displayed endorsement was compensated for the endorsement.

The plurality of endorsements can be displayed in the advertisement are selected from a set of endorsements. A machine learning algorithm that measures effectiveness of an endorsement in generating interest in the advertisement can be used to select the plurality of endorsements. In one embodiment, endorsements can be selected from endorsers that have a known social connection to the user to whom the ad is being displayed. The endorsements can also be endorsed by a plurality of users wherein the plurality of users are known celebrities in the social network where the ad is displayed.

Endorsement Types

Quality and trustworthiness of endorsements may vary by user's expertise as well as user's motivation in providing the endorsement. The systems and methods of the present invention enable distinguishing between endorsements by user type. This distinction may be used to associate different weights to the endorsements as well as use different presentation templates in the ad. In an illustrative embodiment, the following endorsement types may be recognized.

1. Endorsements by regular users.
2. Solicited endorsements by experts in a specific field.
3. Endorsements by organizational experts.
4. Endorsements by celebrities who have a brand identity within a given user community.
5. Endorsements that are made by users with no financial incentive.
6. Endorsements by users who are compensated for writing the endorsement.

Showing Endorsements in Ads

The methods and systems of this invention enable online advertisements to leverage such endorsements, thereby making endorsements available not only on endorsement sites but also on many other websites that allow online advertising. Presence of endorsements in ads has the potential of increasing the trust and engagement level in the reader of the ad, thereby improving the effectiveness of the ad.

Figure 6:
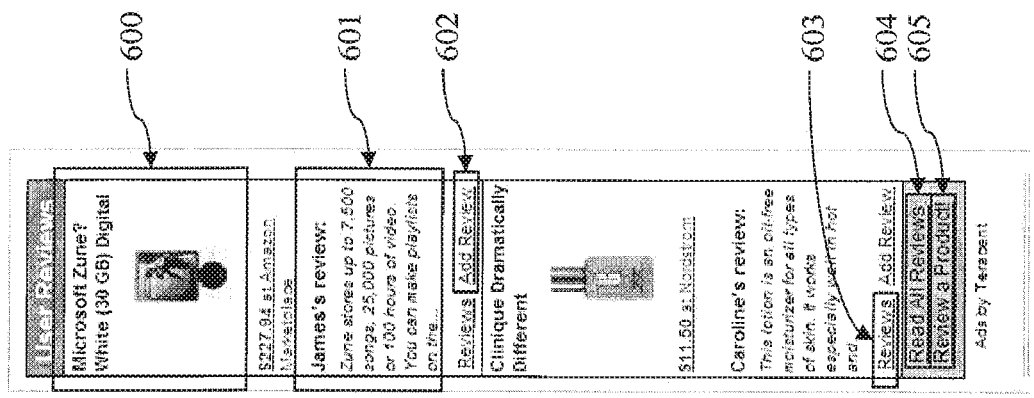
FIG. 6 is a schematic diagram of an illustrative embodiment of an online ad displaying goods and services along with user's endorsements and comprising of an interface to endorse the displayed goods or services.

FIG. 6 is a schematic representation of an illustrative implementation of an online ad displaying user's endorsements. The ad displays two products along with endorsements. The product 600 is displayed with product title, image, price and offering merchant followed by an endorsement 601 of the product by a user. The ad also allows the viewers to add their own endorsements for the product by requesting an interface using the add review link 602 on the ad. Other endorsements of the product can be viewed using the reviews 603 link on the ad. The ad also enables viewing reviews of other products not displayed in the ad using read all reviews 604 link as well as reviewing a plurality of products not displayed in the ad by using the review a product 605 link on the ad.

Using Endorsements to Select Ads

According to Mother aspect of this invention, the embodiments of the present invention can use the number of endorsements, quality and ratings assigned to such endorsements to preferentially select products, services or businesses to advertise. This can complement any other technique used to select the specific product, service or business to advertise out of all the potential candidates.

Figure 10:
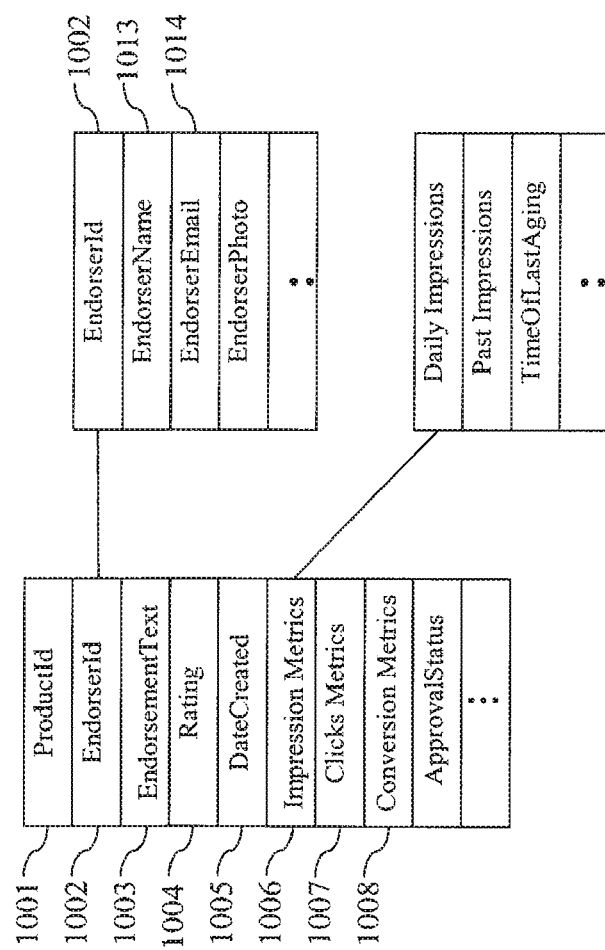
FIG. 10 is a schematic representation of an embodiment depicting storage of endorsement attributes, endorser attributes and learning data to measure the click-through-rate of endorsements.

Referring now to FIG. 10, endorsements are stored for each product 1001 along with attributes of the endorsement such as, for example, endorser's identity 1002, endorser's name 1013, endorser's email address 1014, endorsement text 1003, endorsement rating 1004, date of endorsement 1005, number of times the endorsement has been viewed 1006 and the number of times the endorsement has generated a click 1007 and conversion 1008. In an illustrative embodiment, a product category is chosen by optimizing the objective function CTR as depicted by steps 501-512 in FIG. 5. Selection of products to display within the category is then done based on the number of endorsements for each eligible product. Products with more endorsements are assumed to be of higher interest and are sampled preferentially as compared to products with fewer endorsements. In another embodiment, a probability distribution is created for the ratings associated with the endorsements and products with higher probability of greater ratings are chosen over products with lower probability of generating higher endorsement ratings.

Selecting Endorsements to Show in Ads

According to another aspect of this invention, embodiments of the present invention can use various heuristics to select one or more endorsements to show in the advertisement itself and provide a link to the user to view other endorsements for the advertised product, service or business. In one illustrative embodiment, the heuristic may select endorsements by top endorsers preferentially to show in the ad.

In another illustrative embodiment, the heuristic may use machine learning to adaptively sample endorsements for the same product by different users and measure the resulting clicks to learn if certain endorsements have better probability of being useful. As an illustration, the modeling step during an ad selection may model the objective function CTR for the input feature endorsements for the selected product, and use the optimization step to select endorsements that maximize the objective function. Endorsements that have a higher probability of generating a greater click-through-rate will be selected in this step.

Endorsements in Social Networks

The systems and methods of the present invention allow selecting endorsements provided by users of a website or a social network consisting of multiple websites in ads that are displayed on those websites. This increases the relevance of the endorsements in several ways. Users of a website or a social network may often share similar interests or at least identify themselves as a group that shares similar interests. Users of a website or a social network may also know other users of the sites and therefore have higher likelihood to associate more relevance to the endorsements provided by users they know.

Figure 9:
FIG. 9 is a schematic diagram of an illustrative embodiment of an online ad displaying goods and services along with endorsements for the displayed goods by a plurality of users who are connected to the user to whom the ad is being displayed.

In one embodiment of this invention, social networks that allow users to store their connections to other users of die network may share such connections with the embodiment of the invention, to allow preferential selection of endorsements provided by users that have a closer connection to the user to which the ad is being shown. Referring to FIG. 9, the connections between various users in a social network may be represented by a graph where the nodes represent the users and the edges represent the connections between the users. Connections of a given user 903 can then be represented as a directed graph as illustrated in FIG. 9, by selecting die nodes with which the node corresponding to the given user 903 shares an edge. The sharing of the user's identity and the identities of the user's connections may be done using opaque identifiers to maintain the user's privacy in manner that is well known to those versed in the art of identity federation in social networks and is exemplified in the implementation of protocols such as SAML, Liberty Identity Federation and so forth.

The sharing of such information by providers of the social networks may be mutually beneficial to the providers of the ad who represent an embodiment of the present invention and the providers of die social networks since any increase in relevance of the ads to the users may result in greater conversions of the ads and therefore translate to greater shares of ad revenue to both parties.

Referring again to FIG. 9, the ad displayed to a user 903 can contain endorsements provided by a plurality of user's connections 902 that have given a rating 901 to the product and provided an endorsement text 906. Ratings across all of user's connections can be averaged to display a friend's rating 904 and contrasted against an average rating 905 across all users for that product in the same ad.

Viewing Endorsements

Figure 7:
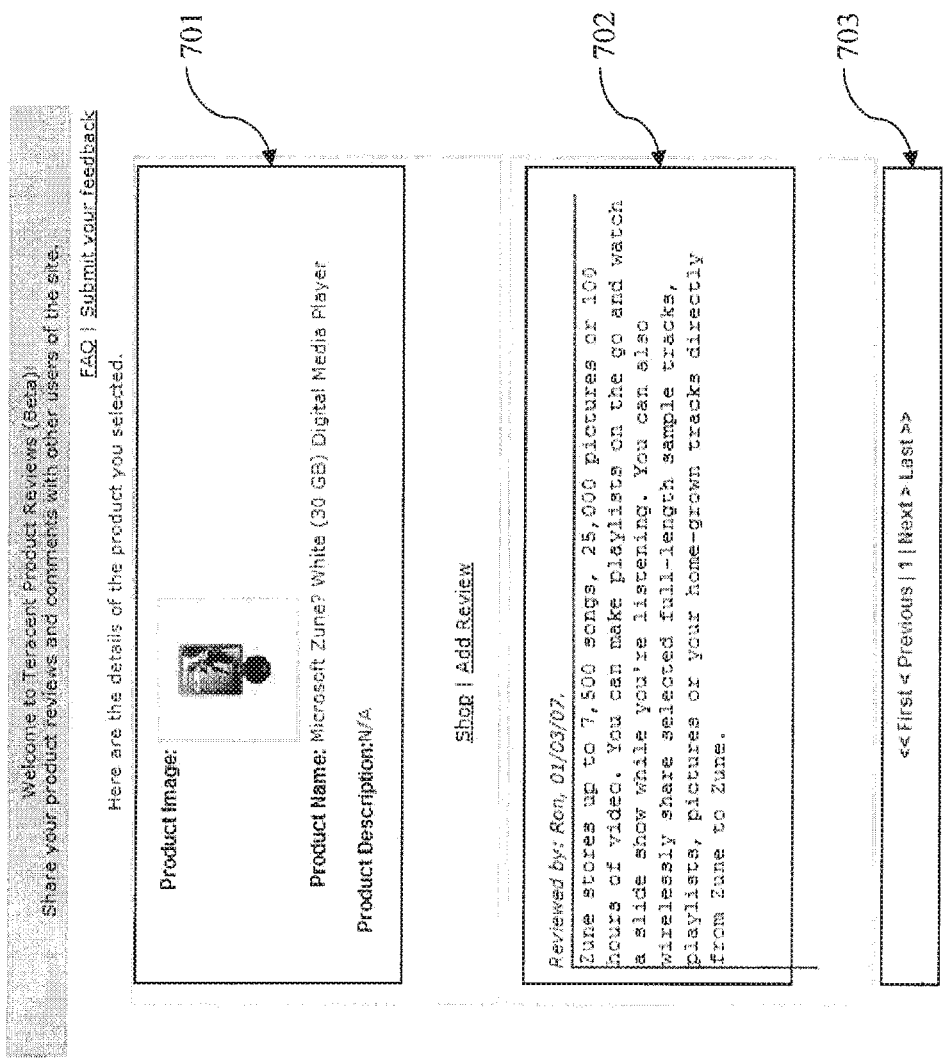
FIG. 7 is a schematic diagram of an illustrative embodiment of an endorsement of a product displayed in the browser context of the ad comprising an interface to view all endorsements for the displayed product.

The systems and methods of the present invention enable users to view endorsements provided by other users for a given product as well as endorsements for all products provided by a given user. The endorsements can be viewed in the browser context of the website where they see the ad without needing to leave the current website and visiting a separate endorsement site, which may provide a better user experience In an illustrative embodiment, the endorsements are stored in relational database tables as depicted in FIG. 10. All endorsements for a given product as well as all endorsements provided by a given user can be retrieved from the relational database using simple queries known to those versed in the art. When the user viewing the ad clicks on the link 603 in FIG. 6 to display all review for selected product, the content of the ad in the given ad window is repainted with a new display that contains the results of the database query to retrieve all reviews for the given product. FIG. 7 is a schematic illustration of the display showing the selected product 701, the currently displayed review 702 and navigational links 703 to view other reviews for the same product.

Ads As Portal To Endorsements

According to yet another aspect of this invention, the systems and methods of the present invention enable users to endorse advertised products, services or businesses in the browser context of the website where they sec the ad, without needing to leave the current site and visiting a separate endorsement site. Embodiments of the present invention may also allow new products to be endorsed in the browser context of the advertisement beyond the advertised product by allowing a search functionality to search for other products, services and businesses all without leaving die website to visit an endorsement site.

Figure 8:
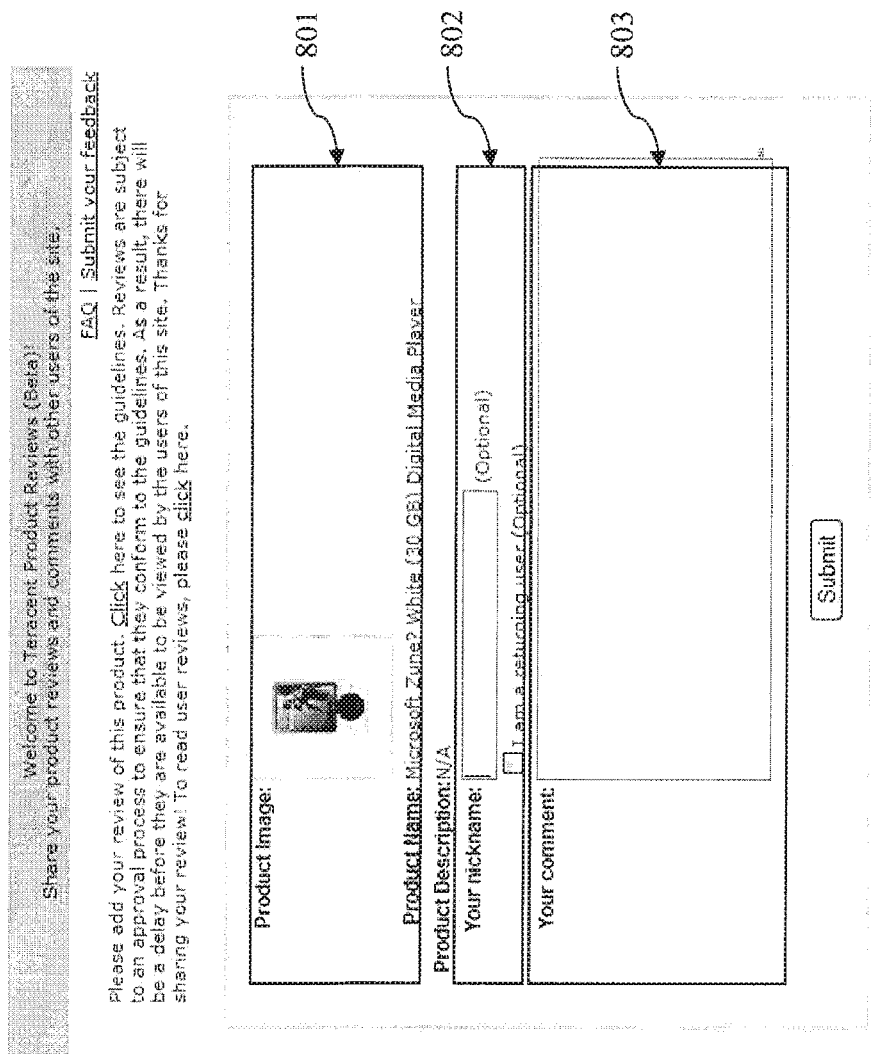
FIG. 8 is a schematic diagram of an illustrative embodiment of an interface to add new endorsement for a product in the browser context of the displayed ad.

Referring to FIG. 6 as an illustrative embodiment, a user is presented with a link 602 to endorse the product displayed in the ad. The user may also be presented with a link 605 to endorse a plurality of products that are not shown in the ad. Upon requesting the link 602 to endorse the current product, the display of the ad is repainted to allow the user to add a new endorsement as depicted in FIG. 8. The user is presented with the selected product details 801, an editable form 802 to collect user's identification details as well as a form 803 to collect endorsement details such as, for example endorsement text. Upon submitting the endorsement, the embodiment may create an entry in the database to record the endorsement provided by the user.

The systems and methods of the present invention enable collecting endorsements in several ways as illustrated.

Using an Endorsement Site

In one embodiment, a separate endorsement site is created for users to create endorsements for products, services and businesses geared specifically for placement in online ads. As such, these endorsements may require additional structural constraints and more specific information about the product, service or business being endorsed, so that an ad can automatically make use of it.

Using Browser Extension to Submit Products for Endorsements

In another embodiment, a simple software module may be written to run in a web browser as a browser extension that can be invoked by a user when visiting any website. Various existing and new technologies to implement browser extensions may be used for this purpose. One illustrative embodiment may include using a JavaScript code as a bookmarklet on the browser. A potential endorser may add this code as a bookmark on the web browser and invoke it by simply selecting the bookmark. Other embodiments may include browser plugins that are written using APIs exposed by specific browsers as may be known to those versed in the art.

A potential endorser may use this browser extension to submit the URL of the website that contains products, services or business to be endorsed to a network server, termed the endorsement server. In one embodiment this can be done by visiting the website in the browser and then invoking the browser extension to automatically have the extension submit the URL for the current webpage. In another embodiment, the user may enter the URL for the website in a special form presented by the browser extension, which then submits it to the endorsement server. The endorsement server may analyze the submitted URL and fetch its content from the merchant's web server. The endorsement server may then create a document object model of the website's markup or use a combination of content parsing technologies known to those versed in the held to extracts products, services and businesses contained in the page The endorsement server may also use a website specific software module that recognizes the structure of the website's markup so that the goods and services can be extracted from the page. Techniques for extracting information from a website markup are well known to those versed in the art. The endorsement server may generate an alert message when it is provided with URLs whose markup structure does not lend to identifying goods and services automatically, so that a manual assistance can be used in analysing its markup structure for future use.

The endorser is then presented with a structured user interface containing a list of extracted goods and services so that the endorser may submit specific endorsements to the endorsement server. This process may make it easier to endorse products, services and businesses by automating the process of entering several details that can be automatically inferred from the website.

Syndicating Endorsements from Other Sites

According to another aspect of the present invention, endorsements for products can be syndicated with endorsement sites. In one embodiment of the invention, endorsements can be syndicated with endorsement sites where users of the site specialize in identifying short term promotional offers by merchants on specific products that represent a deal. In another embodiment, endorsements by experts on a wide range of products can be syndicated for display in the ads.

Figure 11:
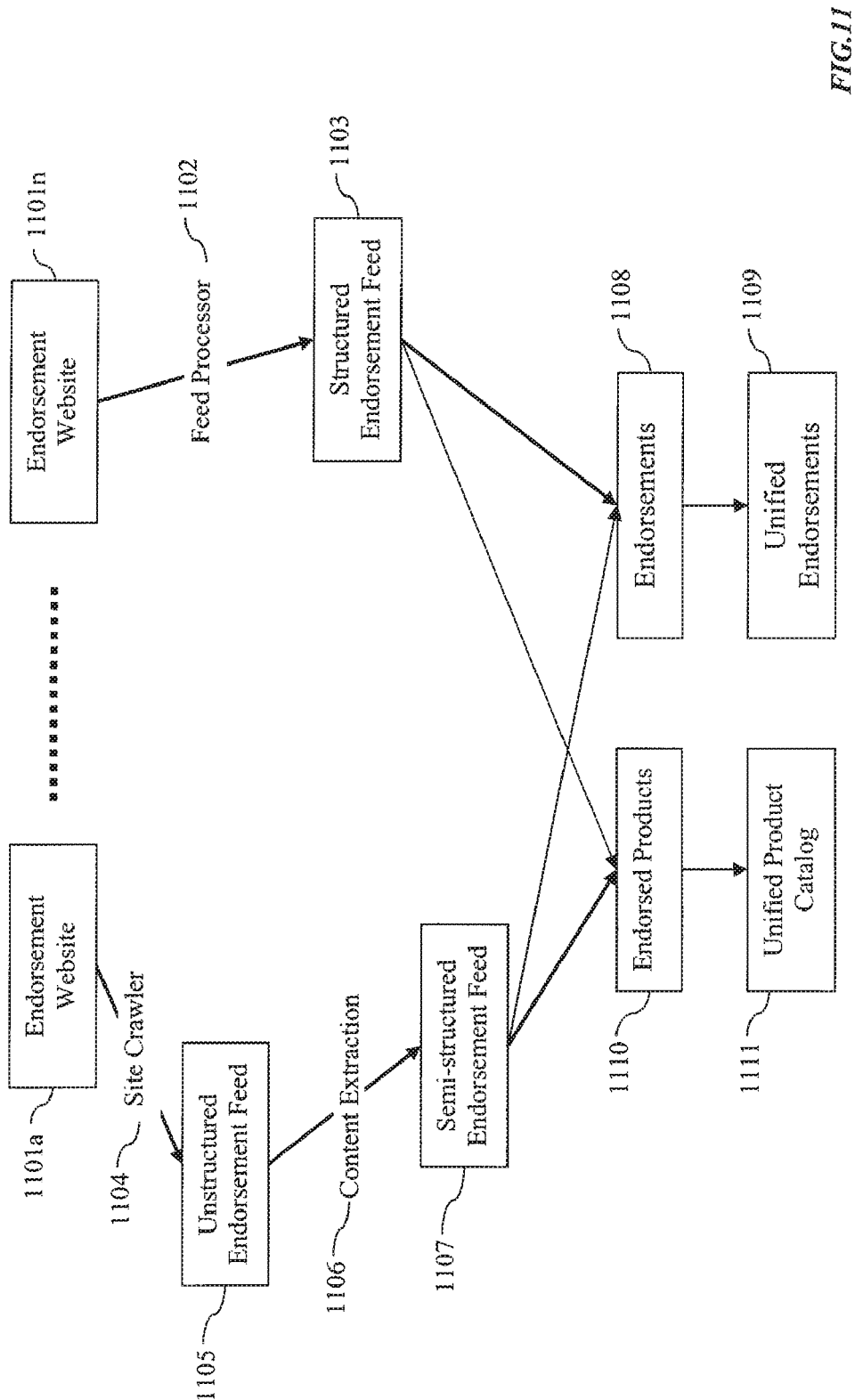
FIG. 11 is a flow chart of a various steps that may be involved in syndicating endorsements from endorsement sites showing various intermediate slates of the endorsement feed in accordance with one embodiment.

The systems and methods of the present invention also enable using endorsements available on existing endorsement sites through business partnerships agreements, and using such endorsements for online ads. FIG. 11 depicts a flow chart of the steps involved in an embodiment of this invention to enable endorsement syndication. The endorsement sites 1101a-1101n may provide a structured endorsement feed represented as an XML document with a corresponding XML schema or as a WebService API conforming to an XML schema. Each data record in the feed may contain attributes of the product or service such as, for example, name, description, list price, UPC code and image URL. The data record may also contain user's endorsement attributes for the product such as, for example, endorsement text, endorser's identity attributes and rating.

A partner specific feed processor 1102 is written as a software module that reads the various products and endorsement attributes from the endorsement feed and converts them to a schema that is specific to the embodiment. A schema translation of this nature may use mappings from the partner specific schema to an embodiment specific schema and may use well known XML transformation techniques such as XSLT as may be known to those versed in the art. The structured endorsement feed 1103 created by the feed processor 1102 defines the attributes of the product and endorsement that are necessary for presentment of the endorsement in an online ad as has been discussed throughout this document. Product attributes may be added to endorsed-products 1110 and the attributes of endorsements can be added to endorsements 1108 in a relational database table in an illustrative embodiment.

Some endorsement sites 1101a may not provide a structured feed but may allow the embodiment to crawl the endorsement site to retrieve endorsements. A site crawler 1104 module may be created for each endorsement site that uses well known HTTP crawling techniques to obtain the web pages displayed by the endorsement site and use content parsing techniques to selectively identify sections of the web pages that contain the endorsements. Such selective identification of sections of the web page uses knowledge of the structure of the content markup (such as HTML markup) for each web site and can be analyzed by HTML parsing tools as known to those versed in the art. One illustrative technique converts the HTML markup to a well-formed XML and then identities the relevant XML nodes using XPath specification for specific sets of XML nodes in an XML document.

The unstructured endorsement feed 1105 created by the site crawler 1104 is then processed for content extraction by identifying various nodes in the XML markup of the endorsement feed 1105 and mapping such nodes to the schema defined by five embodiment for a structured endorsement feed 1103. The unstructured nature of the merchant feed may result in semi-structured endorsement feed 1107 that may not strictly adhere to schema constraints, but may contain mostly accurate information on endorsements. As with the structured endorsement feed 1103, product attributes may be added to endorsed-products 1110 and the attributes of endorsements can be added to endorsements 1108 in a relational database table in an illustrative embodiment. These products and endorsements may then be merged with the unified product catalog 1111 and unified endorsements 1109 across all partner endorsement sites.

DEFINITIONS

In accordance with embodiments of the present invention, the following terms may be defined as follows.

Ad request may refer to a request for advertisement(s). In one embodiment of the invention, such a request may be sent by a browser, on behalf of a user, to an ad server, using HTTP. Ad request may contain several parameter values that may help ad server in targeting ads.

Ad script may refer to a computer program that may help in requesting, receiving, and displaying advertisements). In one embodiment, ad script may be a computer program written in Javascript that may be included in a web page. Upon receiving the web page, a browser may execute the ad script, which may result in the browser sending an ad request to an ad server.

Ad server may refer to a server that may execute the computer programs associated with this invention, among others, to target ads based on the parameters provided by the ad script, among other information.

Ad targeting may refer to a process of selecting and/or dynamically constructing ads that may be relevant to a user visiting a web page.

Ad targeting algorithm may refer to a method used for ad targeting.

Advertisement or ad may refer to any piece of text, image, audio, video, or any combination of these. In one embodiment, advertisement may be displayed alongside a web page in the same browser window, or in another browser window as a pop-up, pop-over, pop-off, pop-under, etc. Advertisement may include information about an entity referred to as an advertiser. Advertisement may also include a hyperlink to a web page on advertiser's web site, referred to as advertiser landing page, such that if a user selects the advertisement, the advertiser landing page is displayed to him/her. Advertiser may be a separate and distinct entity from the publisher who owns the web page where the advertiser's advertisement may be displayed. In such a situation, various financial/commercial arrangements may be associated with the display and/or selection and/or conversion of the ads. In other scenarios, on a given web page of a given web site, the web site publisher may choose to advertise different sections of the same web site, or other web sites belonging to the same publisher. This is sometimes referred to as "self-advertising" or "cross-advertising".

Advertiser may refer to an entity that may sponsor one or more advertisements) that may include information about the advertiser, and may be displayed on a web page.

Advertiser landing page may refer to a web page a link to which may be included in an advertisement, such that if a user selects the advertisement, the advertiser landing page may be displayed to the user.

Advertiser landing page URL may refer to the Universal Resource Locator (URL) of an advertiser landing page.

Advertiser preference may refer to an advertiser's preference regarding where they would like their ads to be displayed. This may include choosing particular web sites or web pages where they may like their ads displayed, or choosing particular web sites or web pages where they may not like their ads displayed.

Advertiser bid price may refer to the maximum price that an advertiser may be willing to pay. Depending on the pricing model, this may refer to the maximum price each time the ad is shown ("per impression"), selected ("per click-through"), or converted into a customer ("per acquisition"), among other pricing models.

Advertiser web server may refer to a server that serves up an advertiser landing page.

Anchor text, or link text, may refer to the text that appears in a web page as the user readable portion of a hyperlink, often using text formatting different from the surrounding text. It may be implemented in HTML as: <A HREF="http://www.site.com/page.html">anchor text</A>

Auto-categorization may refer to the process of computer classification of documents (which could be web pages) into either pre-defined or dynamically generated categories. An example of such a program is available from Autonomy (www.autonomy.com).

Beta Distribution is a mathematical function in probability theory and statistics. It defines a two-parameter family of continuous probability distributions defined on the interval [0,1], with probability density function given by the following equation, where parameters α and β must be greater than zero and B is the beta function.

$$f(x; \alpha, \beta) = \frac{1}{B(\alpha, \beta)} x^{\alpha-1}(1-x)^{\beta-1}.$$

Beta distributions are used extensively in Bayesian statistics, since beta distributions provide a family of conjugate prior distributions for binomial (including Bernoulli) and geometric distributions.

Bookmarks are a feature of many modem day browsers such as for example. Internet Explorer and Netscape, which allows a user to "remember" a web page that he/she has visited. This allows the user to visit that web page again without having to enter the URL of the web page.

Browser may refer to an application typically running on a user's computer that may display web pages to the user.

Browser open box may refer to a box, displayed to a user when he/she selects the open feature of a browser, into which the user inputs a URL corresponding to a web page that he/she wants to visit.

Cookie may refer to a message sent to a web browser by a web server. The message may then be sent back to the web server each time the browser requests a page from the server. One of the purposes of cookies may be to identify users and possibly prepare customized web pages for them.

Conversion may refer to a visitor performing a certain desirable action on a publisher's or advertiser's web site. Examples of desirable actions could be "visit advertiser's landing page", "sign up as a new user on advertiser's web site", "purchase a product on advertiser's web site" etc. Conversion rate may refer to the percentage of visitors that perform the specified, desirable action. For instance, an advertiser may be interested in tracking the "sales conversion rate" due to a particular ad. This may refer to the percentage of visitors referred by the ad, who purchased any product on the advertiser's web site.

Click-through-rate (CTR) may refer to the total number of times an advertisement was selected to the number of times the advertisement was displayed.

Commission may refer to the money, or other consideration, paid by the advertiser when a visitor referred by an advertisement performs a certain desirable action such as for example, purchasing a product on the advertiser's web site.

"document.referrer"—This is the special Javascript variable that contains the Referrer URL of the web page that the Javascript code is a part of.

"document.URL"—This is the special Javascript variable that contains the URL of the web page that the Javascript code is a part of.

Geo-locating technique may refer to a technique that may map an IP address to a geographic area where the computer with that IP address is located. Granularity of the geographic area to which an IP address can be mapped depends on the technique. Examples of a geographic area include a ZIP code, city, state, or country. An example of a geo-locating technique may be found at Quova (www.quova.com).

HTTP, or Hyper Text Transfer Protocol, is a set of rules (protocol) that govern the exchange of most documents and data over the World Wide Web. It is typically used by Web browsers to send requests for a web page to Web Servers, and by the Web Server to send the response, which may contain the web page requested, back to the browser. Current version of HTTP that is widely used is version 1.1, and is described in Request For Comments (RFC) 2616. It can be obtained from www.w3c.org HTTP Request may refer to a request, specified using HTTP rules, for a web document, such as for example, a web page or an advertisement.

Hyperlink may refer to a link to a web page A that is included in another web page B such that when web page B is displayed to a user, the hyperlink to web page A may be highlighted, and if the user selects the hyperlink, the web page B may be displayed to the user.

Impression limit may refer to the maximum number of times that an advertisement may be shown to the same user within a specified time interval, as identified by a cookie. An example of an impression limit is "10 impressions in 12 hours".

Inverse Document Frequency (IDF) is used to weight the frequency of a particular word in a web page. It may be used to compute a web page's similarity to another web page, its relevance to a search query. Refer to the book "Mining the web: Discovering Knowledge from Hypertext Data" by Soumen Chakrabarti, for a discussion.

Javascript: Javascript is a popular scripting language used to write portions of web pages. Javascript code is typically executed by the browser. There are many books that describe Javascript. One such book is "Mastering Javascript and Jscript" by James Jaworski.

Past search referral query may refer to a search referral query that a user may have used, prior to the current visit, to find and access a web page.

Publisher may refer to an entity that creates and publishes web pages with content, often with the purpose of generating revenues off the traffic to the pages.

Publisher web page may refer to a web page created by a publisher that is available for access over the Internet.

Publisher web page URL may refer to the Uniform Resource Locator (URL) that identifies a publisher web page.

Publisher preference may refer to a publisher's preferences regarding ads they may like to display on their web site, or web pages. This may include choosing particular advertisers or ads that they would like to display on (heir web site or web pages, or particular advertisers or ad that they would not like to display on their web site or web pages.

Publisher web server may refer to a web server that serves the publisher web page.

Redirecting web pages is a special type of web page that includes a pointer to another web page. In one embodiment, when a browser requests a redirecting web page, it may receive a special HTTP response code of 302, along with a URL. Upon receiving such a response, the browser may automatically request the URL included in the response.

Redirection server may refer to one or a group of computers executing a computer program associated with this invention, among others, that may receive a request from a browser after a user has selected one of the advertisements. Upon receiving the request, redirection server may store information about the user, advertiser, publisher, and the advertisement(s) displayed and selected. Redirection server may also send back to the browser a URL for the advertiser landing page.

Referrer URL, for a given visit to a web page P, may refer to the URL of the web page that included the hyperlink to P that the user selected to visit P. If the user didn't select a hyperlink to visit P, then, the Referrer URL may be undefined.

Referrer Page may refer to the web page corresponding to the Referrer URL.

Search Box may refer to the part of the UI (e.g. a search engine web page) that prompts and enables users to type in the keywords to search for.

Search Engine may refer to a computer program that may allow users to enter a search query, along with other options, and may return links to documents (e.g. web pages) that satisfy or match the search query entered. Examples include World Wide Web (WWW) search engines like Yahoo (www.yahoo.com), Google (www.google.com) etc., intranet search engines like Verity (www.verity.com), or web site-search engines like Freefind (www.freefind.com) and Ultraseek (www.verity.com), among others.

Search query may refer to the information that a user provides to a search engine, in order to describe what kind of document(s) he/she is looking for. For instance, search query may be a set of words (e.g. "keywords") along with special commands (e.g. "search operators") that may describe what the user is looking for. Search operators may include boolean (e.g. +, −, AND, OR, NOT) and phrase operators (e.g. QUOTE, NEAR). Examples of search query strings include:

cat—find all documents with word cat
    cat AND dog—find all documents with word cat and dog
    cat OR dog—find all documents with word cat or dog
    +cat −dog—find all documents with word cat but not dog
    "cat dog"—find all documents with the phrase "cat dog"

Search referral URL may refer to a special case of referrer URL when referrer URL corresponds to a results page of a search engine. In other words, if a user is visiting a web page P as a result of selecting a result entry on the results page of a search engine, the search referral URL for that particular visit is the URL of the results page. An example of a search referral URL is http://www.google.com/search?hl=en&ie=UTF-8&q=best+type+of+weight+loss+diet&btnG=Google+Search Search referral query, for a given visit of a user to a web page, may refer to a search query that the user may have entered on a search engine, before being referred to that web page. In certain situations, a user may visit a search engine, such as for example, Yahoo (www.yahoo.com) or Google (www.google.com). He/she may enter a search query, say Q, on such a search engine. He/she may select one of the web pages, say P, shown as part of the result of his/her query. Search referral query, for that particular visit to the web page P, is Q. It may be possible, in certain situations, to extract the search referral query from the search referral URL. For instance, in the search referral URL http://www.google.com/search?hl=en&ie=UTF-8&q=best+type+of+weight+loss+diet&btnG=Google+Search, it may be possible, using automatic parsing, to extract the search referral query "best type of weight loss diet".

Search results, or search results page, or results page, may refer to a web page a search engine may display in response to a search query. It may include, among other items, links to pages or documents that match or satisfy the search query entered.

Selecting a search result or selecting a hyperlink, or selecting an advertisement may refer to user's action of choosing a specific result, hyperlink, or advertisement. This may be accomplished by, but not limited to, clicking, using a mouse or other pointer device, on the hyperlink associated with the result, hyperlink, or the advertisement.

Similarity of web pages/documents may refer to the degree to which two or more pages/documents share certain characteristics. For instance, two web pages may be said to be similar if they contain many identical words. There are many techniques of computing "similarity" between two documents or web pages that are described in Information Retrieval (IR) literature. A survey of such techniques may be found in the book "Modem Information Retrieval" by Ricardo Baeza-Yates and Berthier Ribeiro-Neto.

Term Collection may refer to a collection of terms (e.g. words) that appear in a certain web page or document, along with the frequency of each term.

User or visitor may refer to a person or entity that is visiting a web page.

User IP address may refer to the IP address associated with a user's request, as seen by the recipient of the user's request, such as for example, an ad server. Sometimes, the IP address seen by the recipient is not the actual IP address of the user's computer. Instead, it may be the IP address of one of the network devices, such as for example, proxies, that the request may have traveled through. For the purposes of this document, that IP address will be used as the user's IP address.

Visitor is the same as a user.

Web page/web site profile may refer to a collection of characteristics of a web page/web site from an advertising perspective. The profile may help determine what type of ads to display to a user visiting the web page/web site.

Web page may refer to a document on the World Wide Web (WWW) that is identified by a URL. For instance, "http://www.yahoo.com/index.htm" is a web page. A web page may include "Embedded URLs", such as for example embedded images, and scripts, such as for example javascripts, etc. In order to display the web page, a browser may have to fetch the documents corresponding to these embedded URLs, as well as execute the scripts embedded in the web page.

Web site may refer to a collection of web pages under the same domain name. For instance, all the web pages that have "yahoo.com" as their domain name may be said to belong to the web site yahoo.com, or simply Yahoo.

Exemplary Network

FIG. 20 illustrates an exemplary network system 2000 with a plurality of components 2002 in accordance with one embodiment of the present invention. As shown, such components include a network 2004 which take any form including, but not limited to a local area network, a wide area network such as the Internet, and a wireless network 2005. Coupled to the network 2004 is a plurality of computers which may take the form of desktop computers 2006, lap-top computers 2008, hand-held computers 2010 (including wireless devices 2012 such as wireless PDA's or mobile phones), or any other type of computing hardware/software. As an option, the various computers may be connected to the network 2004 by way of a server 2014 which may be equipped with a firewall for security purposes. It should be noted that any other type of hardware or software may be included in the system and be considered a component thereof.

Representative Hardware Environment

A representative hardware environment associated with the various components of FIG. 20 is depicted in FIG. 21. In the present description, the various sub-components of each of the components may also be considered components of the system. For example, particular software modules executed on any component of the system may also be considered components of the system. In particular, FIG. 21 illustrates an exemplary hardware configuration of a workstation 2100 having a central processing unit 2102, such as a microprocessor, and a number of other units interconnected via a system bus 2104.

The workstation shown in FIG. 21 includes a Random Access Memory (RAM) 2106, Read Only Memory (ROM) 2108, an I/O adapter 2110 for connecting peripheral devices such as, for example, disk storage units 2112 and printers 2114 to the bus 2104, a user interface adapter 2116 for connecting various user interface devices such as, for example, a keyboard 2118, a mouse 2120, a speaker 2122, a microphone 2124, and/or other user interface devices such as a touch screen or a digital camera to the bus 2104, a communication adapter 2126 for connecting the workstation 2100 to a communication network 2128 (e.g., a data processing network) and a display adapter 2130 for connecting the bus 2104 to a display device 2132. The workstation may utilize an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

An embodiment of the present invention may also be written using Java, C, and the C++ language and utilize object oriented programming methodology. Object oriented programming (OOP) is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this ease, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing flip ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

JavaScript is an interpreted programming or script language from Netscape. It is somewhat similar in capability to Microsoft's Visual Basic, Sun's Tel, the UNIX-derived Perl, and IBM's REX. In general, script languages are easier and faster to code in than the more structured and compiled languages such as C and C++. JavaScript is used in Web site development to do such things as: automatically change a formatted date on a Web page; cause a linked-to page to appear in a popup window; and cause text or a graphic image to change during a mouse rollover.

JavaScript uses some of the same ideas found in Java. JavaScript code can be imbedded in HTML pages and interpreted by the Web browser (or client). JavaScript can also be run at the server as in Microsoft's Active Server Pages before the page is sent to the requestor. Both Microsoft and Netscape browsers support JavaScript.

Another technology that provides similar function to Java is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for Java without undue experimentation to practice the invention.

A technology of Active X is the component object model (COM). Used in a network with a directory and additional support, COM becomes the distributed component object model (DCOM). The main thing that you create when writing a program to run in the ActiveX environment is a component, a self-sufficient program that can be run anywhere in your ActiveX network. This component is known as an ActiveX control. ActiveX is Microsoft's answer to the Java technology from Sun Microsystems. An ActiveX control is roughly equivalent to a Java applet.

OCX stands for "Object Linking and Embedding control." Object Linking and Embedding (OLE) was Microsoft's program technology for supporting compound documents such as the Windows desktop. The Component Object Model now takes in OLE as part of a larger concept. Microsoft now uses the term "ActiveX control" instead of "OCX" for the component object.

An advantage of a component is that it can be re-used by many applications (referred to as component containers). A COM component object (ActiveX control) can be created using one of several languages or development tools, including C++ and Visual Basic, or PowerBuilder, or with scripting tools such as VBScript.

Transmission Control Protocol/Internet Protocol (TCP/IP) is a basic communication language or protocol of the Internet. It can also be used as a communications protocol in the private networks called intranet and in extranet. When you are set up with direct access to the Internet, your computer is provided with a copy of the TCP/IP program just as every other computer that you may send messages to or get information from also has a copy of TCP/IP.

TCP/IP is a two-layering program. The higher layer, Transmission Control Protocol (TCP), manages the assembling of a message or file into smaller packet that are transmitted over the Internet and received by a TCP layer that reassembles the packets into the original message. The lower layer, Internet Protocol (IP), handles the address part of each packet so that it gets to the right destination. Each gateway computer on the network checks this address to see where to forward the message. Even though some packets from the same message are routed differently than others, they'll be reassembled at the destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received).

Many Internet users are familiar with the even higher layer application protocols that use TCP/IP to get to the Internet. These include the World Wide Web's Hypertext Transfer Protocol (HTTP), the File Transfer Protocol (FTP), Telnet which lets you logon to remote computers, and the Simple Mail Transfer Protocol (SMTP). These and other protocols are often packaged together with TCP/IP as a "suite."

Personal computer users usually get to the Internet through the Serial Line Internet Protocol (SLIP) or the Point-to-Point Protocol. These protocols encapsulate the IP packets so that they can be sent over a dial-up phone connection to an access provider's modem.

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX) is a networking protocol front Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data.

Using a virtual private network involves encryption data before sending it through the public network and decrypting it at the receiving end. An additional level of security involves encrypting not only the data but also the originating and receiving network addresses. Microsoft, 3Com, and several other companies have developed the Point-to-Point Tunneling Protocol (PPP) and Microsoft has extended Windows NT to support it. VPN software is typically installed as part of a company's firewall server.

Wireless refers to a communications, monitoring, or control system in which electromagnetic radiation spectrum or acoustic waves carry a signal through atmospheric space rather than along a wire. In most wireless systems, radio frequency (RF) or infrared transmission (IR) waves are used. Some monitoring devices, such as intrusion alarms, employ acoustic waves at frequencies above the range of human hearing.

Early experimenters in electromagnetic physics dreamed of building a so-called wireless telegraph. The first wireless telegraph transmitters went on the air in the early years of the 20th century. Later, as amplitude modulation (AM) made it possible to transmit voices and music via wireless, the medium came to be called radio. With the advent of television, fax, data communication, and the effective use of a larger portion of the electromagnetic spectrum, the original term has been brought to life again.

Common examples of wireless equipment in use today include the Global Positioning System, cellular telephone phones and pagers, cordless computer accessories (for example, the cordless mouse), home-entertainment-system control boxes, remote garage-door openers, two-way radios, and baby monitors. An increasing number of companies and organizations are using wireless LAN. Wireless transceivers are available for connection to portable and notebook computers, allowing Internet access in selected cities without the need to locate a telephone jack. Eventually, it will be possible to link any computer to the Internet via satellite, no matter where in the world the computer might be located.

A Global Positioning System (GPS) comprises a number of satellites orbiting the Earth that make it possible for user with GPS receivers to pinpoint their geographic location. In general, the satellites may be spaced apart so that from any point on Earth, four satellites will be above the horizon. Each satellite contains a computer, an atomic clock, and a radio. With an understanding of its own orbit and the clock, the satellite continually broadcasts its changing position and time. (Once a day, each satellite checks its own sense of time and position with a ground station and makes any minor correction.) The GPS receiver includes a computer that "triangulates" its own position by getting bearings from three of the four satellites. The result is provided in the form of a geographic position in longitude and latitude. A GPS receiver may also be equipped with a display screen that shows a map so that the receiver's position can be shown on the map. In addition, if a fourth satellite may be received, the receiver/computer may be able to calculate the altitude of the receiver.

Bluetooth is a computing and telecommunications industry specification that describes how mobile phones, computers, and personal digital assistants (PDA's) can easily interconnect with each other and with home and business phones and computers using a short-range wireless connection. Each device is equipped with a microchip transceiver that transmits and receives in a previously unused frequency band of 2.45 GHz that is available globally (with some variation of bandwidth in different countries). In addition to data, up to three voice channels are available. Each device has a unique 48-bit address from die IEEE 802 standard. Connections can be point-to-point or multipoint. The maximum range is 10 meters. Data can be presently be exchanged at a rate of 1 megabit per second (up to 2 Mbps in the second generation of the technology). A frequency hop scheme allows devices to communicate even in areas with a great deal of electromagnetic interference. Built-in encryption and verification is provided.

Wi-Fi (short for "wireless fidelity") is a high-frequency wireless local area network (WLAN). The Wi-Fi technology may be used as an alternative to a wired LAN. Wi-Fi technology may also be installed for a home network. Wi-Fi is specified in the 802.11b specification from the Institute of Electrical and Electronics Engineers (IEEE) and is part of a series of wireless specifications together with 802.11, 802.11a, and 802.11g. All four standards use the Ethernet protocol and CSMA/CA (carrier sense multiple access with collision avoidance) for path sharing.

The 802.11b (Wi-Fi) technology operates in the 2.4 GHz range offering data speeds up to 11 megabits per second. The modulation used in 802.11 may be (and has historically been) phase-shift keying (PSK). The modulation method selected for 802.11b is known as complementary code keying (CCK), which allows higher data speeds and is less susceptible to multipath-propagation interference.

Unless adequately protected, a Wi-Fi wireless LAN may be susceptible to access from the outside by unauthorized users, some of whom have used the access as a free Internet connection. Some exemplary security safeguards that may be implemented to protect a Wi-Fi wireless LAN include, for example, the Wired Equivalent Privacy (WEP) encryption standard, the setup and use of a virtual private network (VPN) or IPsec, and a firewall or DMZ.

Encryption is the conversion of data into a form, called a ciphertext, that cannot be easily understood by unauthorized people. Decryption is the process of converting encrypted data back into its original form, so it can be understood.

The use of encryption/decryption is as old as the art of communication. In wartime, a cipher, often incorrectly called a "code," can be employed to keep the enemy from obtaining the contents of transmissions (technically, a code is a means of representing a signal without the intent of keeping it secret; examples are Morse code and ASCII). Simple ciphers include the substitution of letters for numbers, the rotation of letters in the alphabet, and the "scrambling" of voice signals by inverting the sideband frequencies. More complex ciphers work according to sophisticated computer algorithm that rearrange the data bits in digital signals.

In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security.

The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if a first party sends a message to a second party, the recipient second party may be able to find out the first party's public key (but not the first party's private key) from a central administrator and encrypt a reply message back to the first party using the first party's own public key. When the first party receives the reply message, the reply message may be decrypted by the first party with the first party's private key. In addition to encrypting messages (which ensures privacy), a first party may be able authenticate themselves to second party so that the second party can confirm the identity of the first party (and thus know that it is really the first party who sent the message) by using a private key to encrypt a digital certificate. When the second party receives the encrypted digital certificate, the second party may use the first party's public key to decrypt it.

Wired Equivalent Privacy (WEP) is a security protocol, specified in the IEEE Wireless Fidelity (Wi-Fi) standard, 802.11b, that is designed to provide a wireless local area network (WLAN) with a level of security and privacy comparable to what is usually expected of a wired LAN. In general, a wired local area network (LAN) may be protected by physical security mechanisms (controlled access to a building, for example) that are effective for a controlled physical environment, but may be ineffective for WLANs because radio waves are not necessarily bound by the walls containing the network. WEP may be utilized to help establish similar protection to that offered by the wired network's physical security measures by encrypting data transmitted over the WLAN. Data encryption may be utilized to protect the vulnerable wireless link between clients and access points. Once such a measure has been taken, other LAN security mechanisms such as, for example, password protection, end-to-end encryption, virtual private networks (VPNs), and authentication may be utilized to help ensure privacy.

A pop-up is a graphical user interface (GUI) display area, usually a small window, that suddenly appears ("pops up") in the foreground of the visual interface. Pop-ups can be initiated by a single or double mouse click or rollover (sometimes called a mouseover), and also possibly by voice command or can simply be timed to occur, A pop-up window is usually smaller than the background window or interface; otherwise, it is may be called a replacement interface.

On the World Wide Web, JavaScript (and less commonly Java applets) may be used to create interactive effects including pop-up and full overlay windows. A menu or taskbar pulldown can be considered a form of pop-up. So can the little message box you get when you move your mouse over taskbars in many PC applications.

Plug-in applications are programs that can easily be installed and used as part of your Web browser. Initially, the Netscape browser allowed you to download, install, and define supplementary programs that played sound or motion video or performed other functions. These were called helper applications. However, these applications run as a separate application and require that a second window be opened. A plug-in application is recognized automatically by the browser and its function is integrated into the main HTML file that is being presented.

Plug-in applications are programs that can easily be installed and used as part of your Web browser. Initially, the Netscape browser allowed you to download, install, and define supplementary programs that played sound or motion video or performed other functions. These were called helper applications. However, these applications run as a separate application and require that a second window be opened. A plug-in application is recognized automatically by the browser and its function is integrated into the main HTML file that is being presented.

A browser is an application program that provides a way to look at and interact with all the information on the World Wide Web. The word "browser" seems to have originated prior to the Web as a generic term for user interfaces that let you browse (navigate through and read) text files online. By the time the first Web browser with a GUI was generally available (Mosaic, in 1993), the term seemed to apply to Web content, too. Technically, a Web browser may be considered a client program that uses the Hypertext Transfer Protocol (HTTP) to make requests of Web servers throughout the Internet on behalf of the browser user. Many of the user interface features in Mosaic, however, went into the first widely-used browser, Netscape Navigator. Microsoft followed with its Microsoft Internet Explorer. Lynx is a text-only browser for UNIX shell and VMS users. Another browser is Opera. While some browsers also support e-mail (indirectly through e-mail Web sites) and the File Transfer Protocol (FTP), a Web browser may not be required for those Internet protocols and more specialized client programs are more popular.

Hashing is the transformation of a string of characters into a usually shorter fixed-length value or key that represents the original string. Hashing may be used to index and retrieve items in a database because it is faster to find the item using the shorter hashed key than to find it using the original value. It may also used in encryption algorithms. A hashing algorithm is called the hash function. Hashing may also used to encrypt and decrypt digital signatures (used to authenticate message senders and receivers). The digital signature is transformed with the hash function and then both the hashed value (known as a message-digest) and the signature are sent in separate transmissions to the receiver. Using the same hash function as the sender, the receiver derives a message-digest from the signature and compares it with the message-digest it also received. They should be the same. The hash function may be used to index the original value or key and then used later each time the data associated with the value or key is to be retrieved. Thus, hashing is always a one-way operation. There's no need to "reverse engineer" the hash function by analyzing the hashed values. In fact, the ideal hash function can't be derived by such analysis. A good hash function also should not produce the same hash value from two different inputs. If it does, thus is known as a collision. A hash function that offers an extremely low risk of collision may be considered acceptable.

Some exemplary hash functions include the division-remainder method, the folding method, the radix transformation method and the digit rearrangement method. In the division-remainder method, the size of the number of items in the table is estimated That number is then used as a divisor into each original value or key to extract a quotient and a remainder. The remainder is the hashed value. The folding method divides the original value into several parts, adds the parts together, and then uses the last four digits (or some other arbitrary number of digits) as the hashed value or key. The radix transformation method may be utilized where the value or key is digital. In this method, the number base (or radix) can be changed resulting in a different sequence of digits. For example, a decimal numbered key could be transformed into a hexadecimal numbered key. High-order digits can be discarded to fit a hash value of uniform length. The digit rearrangement method is simply the taking of part of the original value or key such as digits in positions 3 through 6, reversing their order, and then using that sequence of digits as the hash value or key.

A hash function that works well for database storage and retrieval might not work as for cryptographic or error-checking purposes. There are several well-known hash functions used in cryptography. These include the message-digest hash functions MD2, MD4, and MD5, used for hashing digital signatures into a shorter value called a message-digest, and the Secure Hash Algorithm (SHA), a standard algorithm, that makes a larger (60-bit) message digest and is similar to MD4.

A timestamp may be an identifier for transaction that may be used to permit ordering. A timestamp may also be used to verify digital signatures and help reduce the possibility that someone will derive a private key from the public key in a digital certificate. In order to reduce the possibility that someone will derive a private key from the public key in a digital certificate, the certifying authority may issue the key pair with an expiration date so that they must be replaced periodically. Any signature applied after the digital certificate expires is invalid. To assure that a signature was applied before the certificate expired, the certifying authority can timestamp a digital signature. Essentially, that means taking the signature, adding the current time and signing them together. When a digital signature is timestamped in this way, the software can verify that the signature was applied while the certificate was still valid. U.S. Pat. No. 5,136,647 issued to S. A. Haber et al. on Aug. 4, 1992, entitled "Method for secure timestamping of digital documents" is incorporated herein by reference and discloses a variety of technological and algorithmic components of digital timestamping including the linking of timestamp requests in a sequence, a random-witness method that uses the document being timestamped to pseudo-randomly choose timestamping witnesses, the use of a single hash value to represent a timestamp request for an accumulation or collection of digital documents, and a time-stamping process that does not explicitly require the use of a digital signature.

The Secure Sockets Layer (SSL) is a commonly-used protocol for managing the security of a message transmission on the Internet. SSL has recently been succeeded by Transport Layer Security (TLS), which is based on SSL. SSL uses a program layer located between the Internet's Hypertext Transfer Protocol (HTTP) and Transport Control Protocol (TCP) layers. SSL is included as part of both the Microsoft and Netscape browsers and most Web server products. Developed by Netscape, SSL also gained the support of Microsoft and other Internet client/server developers as well and became the de facto standard until evolving into Transport Layer Security. The "sockets" part of the term refers to the sockets method of passing data back and forth between a client and a server program in a network or between program layers in the same computer. SSL uses the public-and-private key encryption system from RSA, which also includes the use of a digital certificate.

TLS and SSL are an integral part of most Web browsers (clients) and Web servers. If a Web site is on a server that supports SSL, SSL can be enabled and specific Web pages can be identified as requiring SSL access. Any Web server can be enabled by using Netscape's SSLRef program library which can be downloaded for noncommercial use or licensed for commercial use. TLS and SSL are not interoperable. However, a message sent with TLS can be handled by a client that handles SSL but not TLS.

A SSL protocol is described in the SSL Protocol Version 3.0 by the Transport Layer Security Working Group, Nov. 18, 1996 for providing communications privacy over the Internet and allowing client/server applications to communicate in a way that is designed to prevent eavesdropping, tampering, or message forgery, the disclosure of which is incorporated herein by reference in its entirety.

Transport Layer Security (TLS) is a protocol that ensures privacy between communicating applications and their users on the Internet. When a server and client communicate, TLS ensures that no third party may eavesdrop or tamper with any message. TLS is a successor to the Secure Sockets Layer (SSL). TLS is composed of two layers: the TLS Record Protocol and the TLS Handshake Protocol. The TLS Record Protocol provides connection security with some encryption method such as the Data Encryption Standard (DES). The TLS Record Protocol can also be used without encryption. The TLS Handshake Protocol allows the server and client to authenticate each other and to negotiate an encryption algorithm and cryptographic keys before data is exchanged. The TLS protocol is based on Netscape's SSL 3.0 protocol; however, TLS and SSL are not interoperable. The TLS protocol docs contain a mechanism that allows TLS implementation to back down to SSL 3.0. A TLS protocol is described in the document entitled, "The TLS Protocol, Version 1" by the Network Working Group of the Internet Society, 1999, the disclosure of which is incorporated herein by reference in its entirety. This document specifics Version 1.0 of the Transport Layer Security (TLS) protocol. The TLS protocol provides communications privacy over the Internet. The protocol allows client/server applications to communicate in a way that is designed to prevent eavesdropping, tampering, or message forgery.

Wireless Transport Layer Security (WTLS) is the security level for Wireless Application Protocol (WAP) applications. Based on Transport Layer Security (TLS) v1.0 (a security layer used in the Internet, equivalent to Secure Socket Layer 3.1), WTLS was developed to address the problematic issues surrounding mobile network devices—such as limited processing power and memory capacity, and low bandwidth—and to provide adequate authentication, data integrity, and privacy protection mechanisms.

Wireless transactions, such as those between a user and their bank, require stringent authentication and encryption to ensure security to protect the communication from attack during data transmission. Because mobile networks do not provide end-to-end security, TLS had to be modified to address the special needs of wireless users. Designed to support datagrams in a high latency, low bandwidth environment, WTLS provides an optimized handshake through dynamic key refreshing, which allows encryption keys to be regularly updated during a secure session.

The Wired Equivalent Privacy (WEP) algorithm, is part of the 802.11 standard. The 802.11 standard describes the communication that occurs in wireless local area networks (LANs). The Wired Equivalent Privacy (WEP) algorithm is used to protect wireless communication from eavesdropping. A secondary function of WEP is to prevent unauthorized access to a wireless network; this function is not an explicit goal in the 802.11 standard, but it is frequently considered to be a feature of WEP. WEP relies on a secret key that is shared between a mobile station (e.g. a laptop with a wireless Ethernet card) and an access point (i.e. a base station). The secret key is used to encrypt packets before they are transmitted, and an integrity check is used to ensure that packets are not modified in transit. The standard docs not discuss how the shared key is established. In practice, most installations use a single key that is shared between all mobile stations and access points.

Embodiments described herein may be implemented using a computer having a central processing unit, such as a microprocessor, and a number of other units interconnected via a bus. The computer may also include Random Access Memory (RAM), Read Only Memory (ROM), an I/O adapter for connecting peripheral devices such as, for example, disk storage units, printers, and the secure device to the bus, a user interface adapter for connecting various user interface devices such as, for example, a keyboard, a mouse, a speaker, a microphone, and/or other interface devices such as a touch screen or a digital camera to the bus, a communication adapter for connecting the computer to a communication network (e.g., a data processing network) and a display adapter for connecting the bus to a display device. The computer may utilize an operating system such as, for example, the Microsoft Windows 95, NT, 98, 2000, ME, or XP Operating System (OS), the IBM OS/2 operating system, the MAC OS. Linux OS or UNIX operating system. Those skilled in the art will appreciate that the present invention may also be implemented on platforms and operating systems other than those mentioned. Embodiments of the present invention may also be implemented using computer program languages such as, for example, ActiveX, Java, C, and the C++ language and utilize object oriented programming methodology.

In addition, based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One of ordinary skill in the art should be able to combine the software created as described with appropriate general purpose or special purpose computer hardware to create a computer system or computer sub-system embodying the method of the invention.

While the various embodiments described herein have been directed at the selecting and placing of ads on web pages, it should be understood that they have been presented by way of example only, and not limitation. Thus, the breadth and scope of a preferred embodiment should not be limited by any of the above described exemplary embodi-

The invention claimed is:

1. A method comprising:
   maintaining, by one or more processors, for a content provider, a data structure including data corresponding to a plurality of products;
   receiving, by the one or more processors, from a client device, a request for content for presentation within a content slot on a webpage, the request including an identifier identifying the client device;
   determining, by the one or more processors, based on the request for content, one or more parameters comprising at least one of dimension data or position data of the content slot corresponding to the request for content;
   selecting, by the one or more processors, using a template selection model, a content item template from a plurality of candidate content item templates based on the one or more parameters corresponding to the request for content, the content item template used to generate content items for insertion within content slots;
   selecting, by the one or more processors, using the identifier identifying the client device, one or more products of the plurality of products;
   generating, by the one or more processors, using the content item template, a content item including data corresponding to the selected one or more products; and
   transmitting, by the one or more processors, the generated content item to the client device for presentation within the content slot on the webpage.

2. The method of claim 1, wherein the data corresponding to the plurality of products comprises at least one of image data, video data, audio data, or text data.

3. The method of claim 2, wherein the dimension data is first dimension data, wherein the content item template is associated with at least one of second dimension data or product attributes, and
   wherein the selecting the one or more products further comprises selecting, by the one or more processors, the one or more products of the plurality of products based on at least one of the second dimension data of the content slot or the product attributes of the one or more products.

4. The method of claim 1, wherein the webpage is a first webpage, wherein the content item comprises an interactive element, and wherein the method further comprises:
   receiving, by the one or more processors, from the client device, an indication of interaction with the interactive element of the content item; and
   causing, by the one or more processors, the client device to navigate to a second webpage associated with the content item.

5. The method of claim 1, further comprising:
   determining, by the one or more processors, using the identifier identifying the client device, a display dimension of the client device and historical data associated with the client device,
   wherein determining the one or more parameters further comprises determining, by the one or more processors, based on the display dimension of the client device, the one or more parameters comprising at least one of the dimension data or the position data of the content slot, and
   wherein selecting the one or more products further comprises selecting, by the one or more processors, using the historical data associated with the client device, the one or more products of the plurality of products.

6. The method of claim 1, further comprising:
   determining, by the one or more processors, a plurality of webpage contents associated with the webpage for presentation of the content item within the content slot; and
   wherein selecting the one or more products further comprises selecting, by the one or more processors, based on the plurality of webpage contents associated with the webpage, the one or more products of the plurality of products to generate the content item for presentation within the content slot on the webpage.

7. The method of claim 1, wherein the content item comprises a first product and a second product of the one or more products, and wherein transmitting the generated content item further comprises:
   transmitting, by the one or more processors, to the client device, the generated content item comprising the first product and the second product, the first product presented within the content slot on the webpage;
   receiving, by the one or more processors, from the client device, an indication of interaction with the content slot on the webpage; and
   causing, by the one or more processors, the second product to be displayed within the content slot on the webpage.

8. The method of claim 1, further comprising:
   receiving, by the one or more processors, from the client device, an indication of interaction with at least one of the selected one or more products included in the content item; and
   causing, by the one or more processors, the client device to display an overlay interface
   associated with the at least one of the selected one or more products for presentation on the webpage.

9. The method of claim 1, wherein selecting the one or more products further comprises:
   selecting, by the one or more processors, using the identifier identifying the client device, a first product of the plurality of products; and
   selecting, by the one or more processors, a plurality of features associated with the first product, and
   wherein generating the content item further comprises generating, by the one or more processors, using the content item template, the content item including the plurality of features associated with the first product.

10. The method of claim 1, wherein the content slot is a first content slot, wherein the content item template is a first content item template, wherein the content item is a first content item, and wherein the method further comprises:
    determining, by the one or more processors, based on the request for content, the one or more parameters comprising at least one of the dimension data or the position data of a second content slot corresponding to the request for content;
    selecting, by the one or more processors, using the template selection model, a second content item template from the plurality of candidate content item templates based on the one or more parameters corresponding to the request for content, the second content item template used to generate additional content items for insertion within the content slots;
    selecting, by the one or more processors, using the identifier identifying the client device, additional one or more products of the plurality of products;

generating, by the one or more processors, using the second content item template, a second content item including data corresponding to the additional one or more products; and transmitting, by the one or more processors, the second content item to the client device for presentation within the second content slot on the webpage.

11. A system comprising:

a data processing system comprising one or more processors and memory, the data processing system configured to:

maintain, for a content provider, a data structure including data corresponding to a plurality of products;

receive, from a client device, a request for content for presentation within a content slot on a webpage, the request including an identifier identifying the client device;

determine, based on the request for content, one or more parameters comprising at least one of dimension data or position data of the content slot corresponding to the request for content;

select, using a template selection model, a content item template from a plurality of candidate content item templates based on the one or more parameters corresponding to the request for content, the content item template used to generate content items for insertion within content slots;

select, using the identifier identifying the client device, one or more products of the plurality of products;

generate, using the content item template, a content item including data corresponding to the selected one or more products; and transmit the generated content item to the client device for presentation within the content slot on the webpage.

12. The system of claim 11, wherein the data corresponding to the plurality of products comprises at least one of image data, video data, audio data, or text data.

13. The system of claim 12, wherein the dimension data is first dimension data, wherein the content item template is associated with at least one of second dimension data or product attributes, and wherein to select the one or more products, the data processing system is configured to select the one or more products of the plurality of products based on at least one of the second dimension data of the content slot or the product attributes of the one or more products.

14. The system of claim 11, wherein the webpage is a first webpage, wherein the content item comprises an interactive element, and wherein the data processing system is further configured to:

receive, from the client device, an indication of interaction with the interactive element of the content item; and cause the client device to navigate to a second webpage associated with the content item.

15. The system of claim 11, wherein the data processing system is further configured to:

determine, using the identifier identifying the client device, a display dimension of the client device and historical data associated with the client device, wherein to determine the one or more parameters, the data processing system is configured to determine, based on the display dimension of the client device, the one or more parameters comprising at least one of the dimension data or the position data of the content slot, and wherein to select the one or more products, the data processing system is configured to select, using the historical data associated with the client device, the one or more products of the plurality of products.

16. The system of claim 11, wherein the data processing system is further configured to:

determine a plurality of webpage contents associated with the webpage for presentation of the content item within the content slot; and wherein to select the one or more products, the data processing system is configured to select, based on the plurality of webpage contents associated with the webpage, the one or more products of the plurality of products to generate the content item for presentation within the content slot on the webpage.

17. The system of claim 11, wherein the content item comprises a first product and a second product of the one or more products, and wherein to transmit the generated content item, the data processing system is configured to:

transmit, to the client device, the generated content item comprising the first product and the second product, the first product presented within the content slot on the webpage;

receive, from the client device, an indication of interaction with the content slot on the webpage; and cause the second product to be displayed within the content slot on the webpage.

18. The system of claim 11, wherein the data processing system is further configured to:

receive, from the client device, an indication of interaction with at least one of the selected one or more products included in the content item; and cause the client device to display an overlay interface associated with the at least one of the selected one or more products for presentation on the webpage.

19. The system of claim 11, wherein to select the one or more products, the data processing system is configured to:

select, using the identifier identifying the client device, a first product of the plurality of products; and select a plurality of features associated with the first product, and wherein to generate the content item, the data processing system is configured to generate, using the content item template, the content item including the plurality of features associated with the first product.

20. The system of claim 11, wherein the content slot is a first content slot, wherein the content item template is a first content item template, wherein the content item is a first content item, and wherein the data processing system is further configured to:

determine, based on the request for content, the one or more parameters comprising at least one of the dimension data or the position data of a second content slot corresponding to the request for content;

select, using the template selection model, a second content item template from the plurality of candidate content item templates based on the one or more parameters corresponding to the request for content, the second content item template used to generate additional content items for insertion within the content slots;

select, using the identifier identifying the client device, additional one or more products of the plurality of products;

generate, using the second content item template, a second content item including data corresponding to the additional one or more products; and transmitting, by the one or more processors, the second content item to the client device for presentation within the second content slot on the webpage.

\* \* \* \* \*